United States Patent [19]
Bergen et al.

[11] Patent Number: 5,587,802
[45] Date of Patent: Dec. 24, 1996

[54] EXTENDED DEFINITION VIDEO SIGNAL CONVERTER FOR USE WITH A VIDEO RECORDER

[75] Inventors: Franciscus H. M. Bergen; Jan J. Rotte; Stephanus J. J. Nijssen; Peter H. N. De With, all of Eindhoven, Netherlands

[73] Assignee: U.S. Philips Corporation, New York, N.Y.

[21] Appl. No.: 120,987

[22] Filed: Sep. 13, 1993

Related U.S. Application Data

[62] Division of Ser. No. 869,290, Apr. 15, 1992, Pat. No. 5,293,248.

[30] Foreign Application Priority Data

May 6, 1991 [EP] European Pat. Off. .............. 91201070
Feb. 27, 1992 [EP] European Pat. Off. .............. 92200566

[51] Int. Cl.⁶ ..................................................... H04N 9/79
[52] U.S. Cl. .................................................. 386/26; 386/37
[58] Field of Search ..................................... 358/310, 330, 358/328; 348/441, 442, 443, 444, 445, 446, 447, 448, 449, 450, 451, 452, 453, 454, 455, 456, 457, 458, 459, 663; H04N 9/79, 14/20, 14/06, 7/01, 7/04, 5/92

[56] References Cited

U.S. PATENT DOCUMENTS

| | | | |
|---|---|---|---|
| 3,609,229 | 9/1971 | Mosca et al. | 358/426 |
| 3,634,616 | 1/1972 | Dann | 358/327 |
| 4,602,274 | 7/1986 | Acampora et al. | 348/441 |
| 4,761,690 | 8/1988 | Yamanishi et al. | 358/330 |
| 4,910,605 | 3/1990 | Sasaki et al. | 358/312 |
| 5,047,865 | 9/1991 | Inoue | 358/310 |
| 5,258,851 | 11/1993 | Yamaguchi | 358/310 |

*Primary Examiner*—Thai Q. Tran
*Attorney, Agent, or Firm*—Bernard Franzblau

[57] ABSTRACT

A converter with which an extended definition (ED) video signal may be converted into a signal that may be recorded by a video recorder and with which a signal read out by a video reorder may be converted to an ED video signal. The ED video signal includes first lines having a first luminance signal ($Y_1$) and a chrominance signal (C), and second lines having no chrominance signal but a second luminance signal ($Y_2$) in the form of a modulated luminance signal with suppressed carrier. The converter includes a separation unit which receives the ED video signal from an input terminal and has three outputs. A first output couples the first luminance signal to a first output terminal via a first signal combination unit. A second output couples the chrominance signal to a second output terminal via a second combination unit. The third output is coupled to the first output terminal via a mixer circuit and the first combination unit.

20 Claims, 13 Drawing Sheets

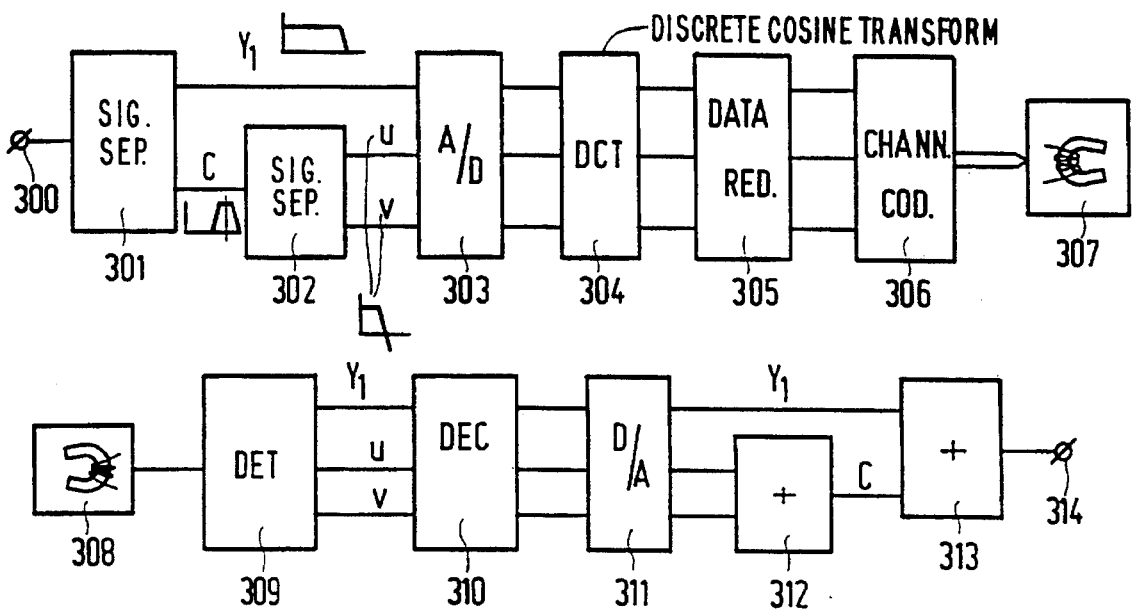
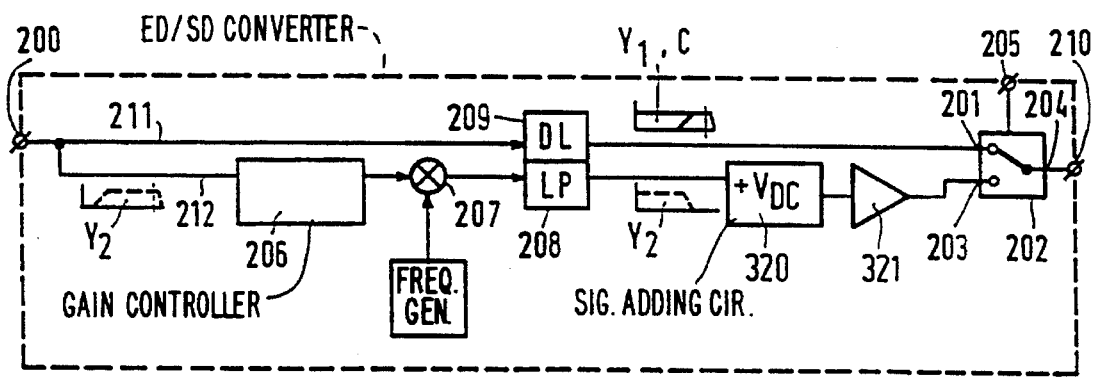
FIG.16
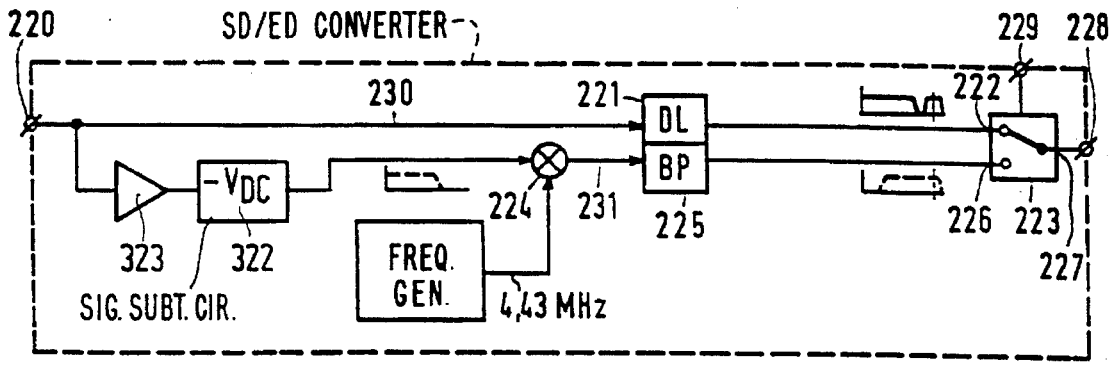
FIG.17
FIG.18

EXTENDED DEFINITION VIDEO SIGNAL CONVERTER FOR USE WITH A VIDEO RECORDER

This is a division of application Ser. No. 07/869,290, filed on Apr. 15, 1992, now U.S. Pat. No. 5,293,248.

BACKGROUND OF THE INVENTION

1. Field of the Invention

This invention relates to a system for recording and reproducing a video signal in/from a track on a magnetic record carrier, comprising a recording device which includes:

an input terminal for receiving the video signal, a separation unit having an input coupled to the input terminal, and first and second outputs, which separation unit is arranged to derive a luminance signal from the video signal and present this luminance signal at the first output, and for deriving a chrominance signal and presenting same at the second output, a first signal path comprising an FM modulator, a second signal path, comprising a mixer stage, a signal combining unit having first and second inputs coupled to an output of the respective first and second signal paths, and an output, writing means having an input coupled to the output of the signal combining unit, the system further including a reproducing device which comprises;

reading means having an output, a separation unit having an input coupled to the output of the reading means and first and second outputs, which separation unit is arranged to derive an FM-modulated luminance signal from the signal read from the track by the reading means and to present this luminance signal at the first output, and for deriving a frequency-converted chrominance signal and presenting same at the second output, a first signal path including an FM demodulator, a second signal path including a mixer stage, a first output terminal coupled to an output of the first signal path, for presenting the demodulated luminance signal, and a second output terminal coupled to an output of the second signal path for applying the frequency-shifted chrominance signal to a recording device and a reproducing device to be used in the system, to a converter means for converting an extended definition (ED) video signal to a video signal that can be recorded on a video tape recorder, and to a converter means for converting a video signal reproduced by a video tape recorder to an extended definition video signal.

2. Description of the Related Art

A system of the type mentioned in the opening paragraph is known, for example, from Funkschau, No. 6, 1988, pp. 34 and 35. This publication describes how an SD video signal in the form of a PAL video signal is recorded on the record carrier by means of a VHS video tape recorder and an SVHS video tape recorder. Several years ago it was proposed to realize video pictures having a 16:9 aspect ratio in lieu of video pictures having a 4:3 aspect ratio. Pictures having such a 16:9 aspect ratio form a better link to the word of films and to the properties of the human eye. As long as television sets with 4:3 format picture screens are still used, a television broadcast in the 16:9 format will have to be reverse-compatible. In other words, for television signals broadcast in the 16:9 format must also be reproducible by a television set having a 4:3 picture green. Such a reverse compatibility can be realized with an extended definition video signal in the form of the PAL-PLUS television signal. For a description of the PAL-PLUS television signal, reference may be made to two publications in Funkschau, No. 15, 1990, pp. 49–51 and No. 23, 1990, pp. 46–47 and Fernseh- und Kino-Technik, No. 8, 1989, pp. 407–410 and No. 10, 1989, pp. 522–526.

SUMMARY OF THE INVENTION

It is an object of the invention to provide a system with which it is possible to record and reproduce an extended definition (ED) video signal. The system according to the invention is therefore characterized in that it is arranged for recording an ED video signal in the form of pictures, each picture comprising first lines having a chrominance signal and a first luminance signal and second lines comprising a second luminance signal modulated with a suppressed carrier, in that the system is arranged for reproducing the recorded ED video signal, in that the recording device comprises a third signal path having an output coupled to a third input of the signal combining unit and comprises supply means having an input coupled to the input terminal and an output coupled to the input of the third signal path, which supply means are arranged to supply the second luminance signal in the second lines to the input of the third signal path, in that the reproducing device also comprises a third signal path having an output coupled to a third output terminal for supplying the second luminance signal, in that the signal path leading from the input terminal of the recording device to the third output terminal of the reproducing device via the third signal paths in these devices comprises at least a first mixer stage, and in that this mixer stage is arranged for shifting the frequency spectrum of the second luminance signal.

In a further embodiment the signal path comprises two mixer stages. In that case the reproducing device-always comprises at least one mixer stage.

The invention is based on the understanding that the second lines in the ED video signal have different contents from the first lines. The second lines do not have a chrominance signal and, in addition, the second luminance signal in the second lines is different from the first luminance signal in the way that the second luminance signal slightly looks like a chrominance signal as regards its frequency characteristic. The second luminance signal may be AM or quadrature modulated. According to the invention the recording device comprises a third signal path for processing the second luminance signal before this second luminance signal is combined with the first luminance signal and the chrominance signal processed in the first and second signal paths, after which the combined signals may be recorded. The reproducing device also comprises a third signal path for processing the second luminance signal read from the record carrier.

According to the invention there are now a plurality of options for processing the second luminance signal in the recording device. Three options will be further discussed hereinbelow.

In a first option the second luminance signal is subjected to direct FM modulation in the manner in which the first luminance signal is processed. There is then the possibility of using the FM modulator in the first signal path also for FM modulation of the second luminance signal. If the second luminance signal is not mixed during recording, at least the one mixer stage (both mixer stages) necessary for further processing the second luminance signal is (are) located in the third signal path of the reproducing device. If the third signal path of the reproducing device comprises not more than one mixer stage, the second luminance signal is modulated to the baseband by this mixer stage and may then be applied to a television set as a baseband signal. If the third signal path of the reproducing device comprises two mixer stages, the original frequency characteristic of the second luminance signal may be regenerated.

In a second option the second luminance signal is first mixed with a certain frequency after which the second luminance signal mixed to another frequency range is FM modulated in an FM modulator. The mixer stage necessary for this purpose in the third signal path of the recording device could then be used in common with a mixer stage in the second signal path. It should be observed here that a second mixer stage is not necessary per force at the reproducing end. If the mixing frequency has been properly selected at the recording end, it is possible to regain at the reproducing end a baseband-demodulated second luminance signal that can be applied to a television set. If the third signal path of the reproducing device also comprises a mixer stage, the original frequency characteristic of the second luminance signal may be regenerated.

In a third option the second luminance signal is also mixed with a certain frequency and, subsequently, the second luminance signal mixed to another frequency range is recorded directly via the chrominance channel.

A recording device according to the first and second options may thereto be characterized in that the supply means comprise first controllable switching means having first and second inputs coupled to the input terminal and the first output of the separation unit respectively, and an output coupled to the input of the first signal path, and in that the first switching means are arranged for connecting, in response to a control signal, the first input to the output at least during the presence of the second luminance signal in the second lines in the ED video signal, and for connecting the second input to the output at least during the presence of the first luminance signal present in the first lines in the ED video signal.

A recording device according to the first option may further be characterized in that the second lines in the ED video signal furthermore comprise a burst, in that the device comprises second switching means having an input coupled to the second output of the separation unit and an output coupled to the input of the second signal path, and in that the second switching means are arranged for connecting, in response to the control signal, the input to the output during the first lines and during the presence of the burst in the second lines in the ED video signal, and for interrupting the connection between the input and output during the presence of the second luminance signal in the second lines. This device subsequently processes the second luminance signal as the first luminance signal.

In the second option the recording device may be characterized in that, the device comprises second controllable switching means having first and second inputs and an output, in that the output of the first switching means is coupled to the first input of the second switching means and an input of the first mixer stage, in that an output of the first mixer stage is coupled to the second input of the second switching means, the output of the second switching means being coupled to the input of the FM modulator, in that the second switching means are arranged for connecting, in response to the control signal, the second input to the output at least during the presence of the second luminance signal in the second lines in the ED video signal, and for connecting the first input to the output at least during the presence of the first luminance signal in the first lines. In this embodiment the second luminance signal may be mixed with another frequency than the mixing frequency with which the chrominance signal is mixed in the mixer stage in the second signal path.

However, the recording device may also be characterized in that, the supply means comprise first switching means having first and second inputs coupled to the input terminal and second output of the separation unit respectively, and an output coupled to the input of the mixer stage in the second signal path, in that the device further includes second switching means having first and second inputs coupled to the first output of the separation unit and the output of the mixer stage respectively, and an output coupled to the input of the FM modulator in the first signal path, in that the first switching means are arranged for connecting, in response to a control signal, the first input to the output at least during the presence of the second luminance signal in the second lines in the ED video signal, and for connecting the second input to the output at least during the presence of the chrominance signal in the first lines in the ED video signal, and in that the second switching means are arranged for connecting, in response to the control signal, the second input to the output at least during the presence of the second luminance signal in the second lines, and for connecting the first input to the output at least during the presence of the first luminance signal in the first lines. In this case, it will thus be sufficient to have a single mixer stage, that is to say, the mixer stage in the second signal path which is then used in common by the second and third signal paths. The mixing frequencies with which the second luminance signal and the chrominance signal are mixed may be identical or different.

This recording device may further be characterized in that third controllable switching means are inserted between the output of the mixer stage and the second input of the signal combining unit, and in that the third switching means are arranged for interrupting, in response to the control signal, a connection between the output of the mixer stage and the second input of the signal combining unit during the presence of the second luminance signal in the second lines in the video signal. This structure avoids supplying a mixed second luminance signal to the second input of the signal combining unit during the second lines.

In the third option, the recording device comprising a common mixer stage for the second and third signal paths may be characterized in that, the supply means comprise first controllable switching means having first and second inputs coupled to the input terminal and the second output of the separation unit, respectively, and an output coupled to the input of the mixer stage in the second signal path, and in that the first switching means are arranged for connecting, in response to the control signal, the first input to the output at least during the presence of the second luminance signal in the second lines in the ED video signal, and for connecting the second input to the output at least during the presence of the chrominance signal present in the first lines in this signal. This device may further be characterized in that a low-pass filter is inserted in the second signal path between the mixer stage and the second input of the signal combining unit, and in that the device further includes switching means for switching off, in response to the control signal, the filter operation in a low-pass filter at least during the presence of the second luminance signal in the second lines in the ED video signal.

For reproducing the second luminance signal recorded in the first or second option, the reproducing device is first to demodulate the second luminance signal in an FM demodulator which may be used in common with the FM demodulator in the first signal path. A second luminance signal will then be obtained which is modulated at an unsteady carrier frequency. This is caused by the time errors occurring while the signal is being read out from the record carrier. For obtaining a second luminance signal having a fixed suppressed carrier, the second luminance signal is first still to be mixed in a manner known per se for the reproduction of a chrominance signal. Various embodiments of such a reproducing device are described as well as a reproducing device for reading the second luminance signal as recorded with a recording device of the third option.

The invention furthermore relates to converter means in which an ED video signal can be converted to a signal that may be recorded by a standard video recorder, such as a VHS or SVHS video recorder, or a digital video recorder.

The invention further relates to converter means in which a video signal reproduced by a standard video recorder, such as a VHS or SVHS video recorder or a digital video recorder is converted to an ED video signal. Finally, the invention relates to a record carrier on which the ED video signal is recorded.

BRIEF DESCRIPTION OF THE DRAWINGS

The invention will be further explained in the description of the drawings following hereinbelow with reference to a number of embodiments. In the description of the drawings the invention will be described with respect to the recording and reproduction of a PAL-PLUS video signal. It should be observed, however, that the invention is likewise applicable to the recording and reproduction of ED video signals according to a different standard, such as NTSC, provided that the ED-NTSC signal has the format specified in this invention. For a description of ED video signals of the NTSC type, reference is made to EP 357,144, corresponding to U.S. Pat. No. 4,984,078. In the drawing:

FIG. 2a1 shows the frequency spectrum of the first lines of the video picture while FIG. 2a2 shows the signal content in the first lines of the video picture, FIG. 2b2 shows the signal content in the second lines of the video picture.

FIG. 16 shows a block diagram of a digital video recorder;

FIGS. 17 and 20 show the converter means for converting a PAL-PLUS video signal to a signal suitable for recording by a digital video recorder;

FIGS. 18 and 21 show the converter means for converting a signal reproduced by a digital video recorder to a PAL-PLUS video signal.

DESCRIPTION OF THE PREFERRED EMBODIMENTS

Figure 1:
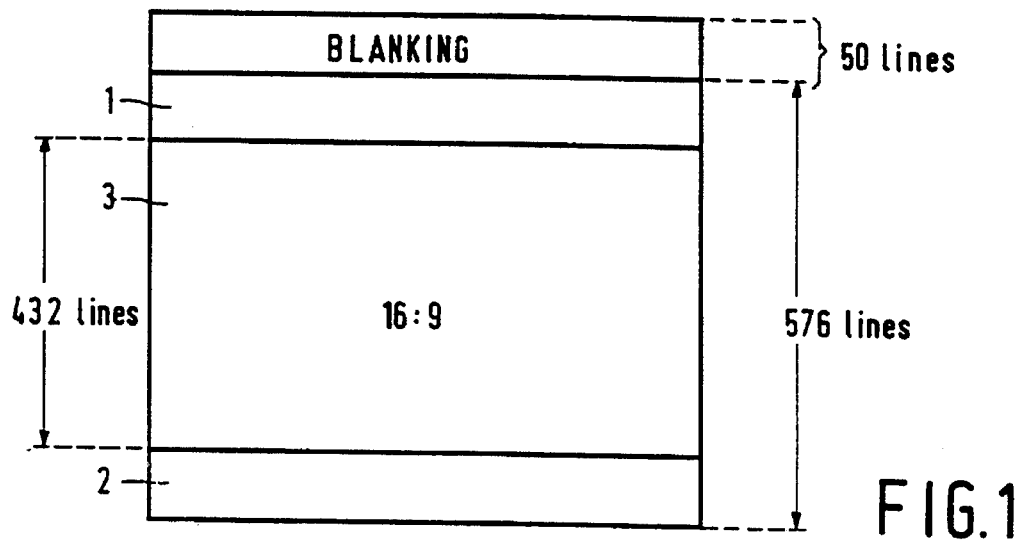
FIG. 1 shows a picture as it may be reproduced on a television screen.

FIG. 1 shows a picture screen for displaying pictures which have a 4:3 aspect ratio and which are made up of 625 video lines. The 625 lines are divided over two fields of interlineated structures. The first 50 lines form the blanking of the video picture. During these lines the vertical flyback may take place and, for example, teletext information is to be found in these lines. With the video information in the remaining 575 lines of a PAL video signal, a picture having the 4:3 aspect ratio may be visualized on the picture screen. The picture screen of the currently available television sets is then exactly filled. The frequency spectrum of the lines in a PAL CVBS (chroma-video-blanking sync) signal are represented in FIG. 2a1. The luminance signal $Y_1$ in the video signal is found in a frequency range from 0 to about 5 MHz. The chrominance signal C is found in a frequency range from about 3.0 to 5 MHz. In this frequency range the luminance and chrominance signals are frequency interlaced. The chrominance signal is quadrature modulated with a frequency of about 4.43 MHz (with a suppressed carrier). Furthermore, FIG. 2a2 shows the signal content of a signal during one line period (1H) as a function of time, with the sync S and the burst B. Thus, a picture having a 4:3 aspect ratio may be displayed on the picture screen while covering the entire screen.

Currently, video signal sources are known producing a video signal obtained from a picture recording having a 16:9 aspect ratio. Such a width-to-height ratio better fits in with the world of films and with the properties of the human eye. Furthermore, there are picture display devices having a picture screen with a 16:9 aspect ratio on which pictures having a similar aspect ratio are displayed covering the entire screen. 576 lines in the video picture are then available for this purpose.

For displaying a picture having a 16:9 aspect ratio on a picture screen having a 4:3 aspect ratio, 432 lines can be used. The picture screen is then filled across its width. At the top and bottom of the picture screen, however, black bands will then appear which are 72 lines in height. This now happens when some film formats are displayed on a television picture screen.

A format for the video signal having pictures of a 16:9 aspect ratio is to be proposed so that the reverse compatibility is ensured. This is to mean that the video signal is to be such that the video signal is displayed on a picture screen having a 16:9 aspect ratio and fully covers same and can also be visualized on a picture screen having a 4:3 aspect ratio without the loss of video information. This may be performed, for example, in the manner described hereinbefore, that is to say, in the form of 432 lines in a letterbox format with bands of 72 lines in height.

For this purpose a signal format is proposed known by the name of PAL-PLUS. The structure of the PAL-PLUS video signal is as follows. A first field of a number of blanking lines, 36 lines in the band referenced 1 in FIG. 1 (denoted "second" video lines), 216 lines of signal contents as those already shown in FIGS. 2a1 and 2a2 (referenced "first" video lines) and again 36 second video lines in the band referenced 2 in FIG. 1. Then, a second field also comprising a number of blanking lines, 36 second video lines, 216 first video lines and again 36 second video lines. The two fields together form the picture having a total of 625 lines.

The signal content in the second video lines is to be such that a standard television set having a 4:3 picture screen displays this signal as a picture in the part referenced 3 of the picture screen and having black bands in the parts referenced 1 and 2 of the picture screen shown in FIG. 1. In addition, the signal contents in the second video lines are to be such that, in combination with the signal contents in the 432 first video lines, the contents may be used for displaying on a 16:9 picture screen a picture which is 576 lines high and thus covers the entire screen.

FIG. 2b1 shows the frequency spectrum of the second video lines. The signal in the second video lines has the shape of a luminance signal $Y_2$ modulated with a frequency of about 4.43 MHz (with suppressed carrier), and has a peak-to-peak amplitude of about 300 mV around the blanking level. The frequency spectrum of the second luminance signal extends from about 0.5 MHz to about 5 MHz. The second luminance signal may be AM or quadrature modulated. FIG. 2b2 shows the signal plotted against time during a video line time (1H). The second video lines furthermore include a sync signal and a burst signal analogous to the first video lines.

Figure 3:
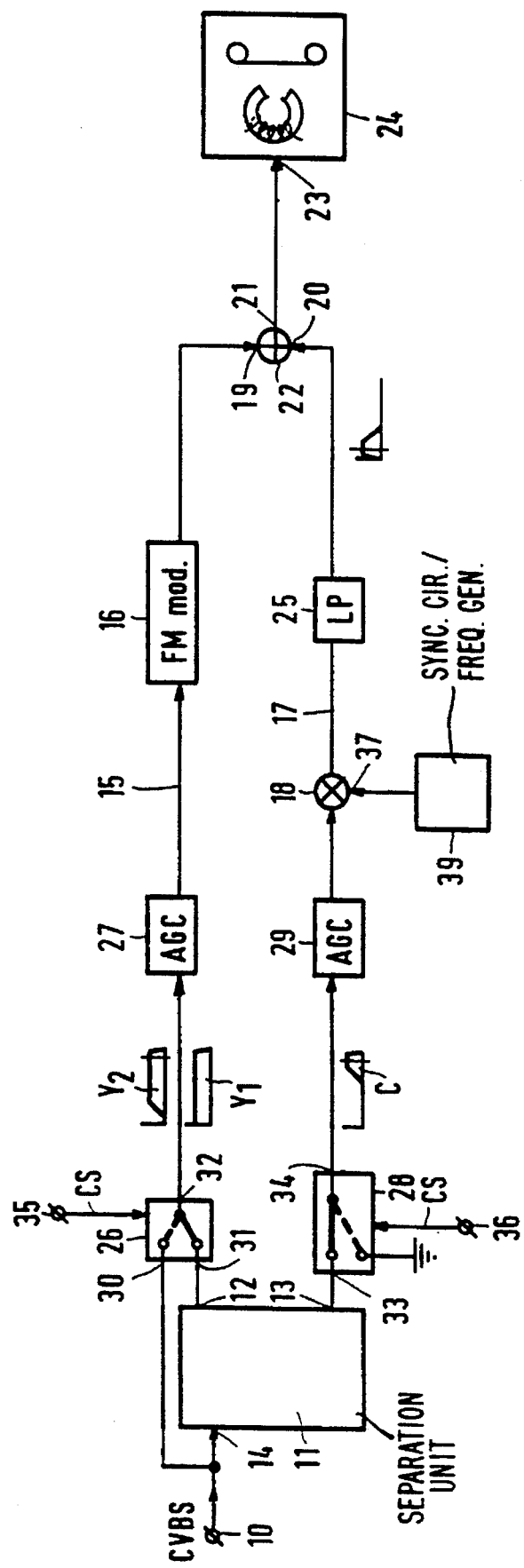
FIG. 3 shows a first exemplary embodiment of the recording device.
Figure 4:
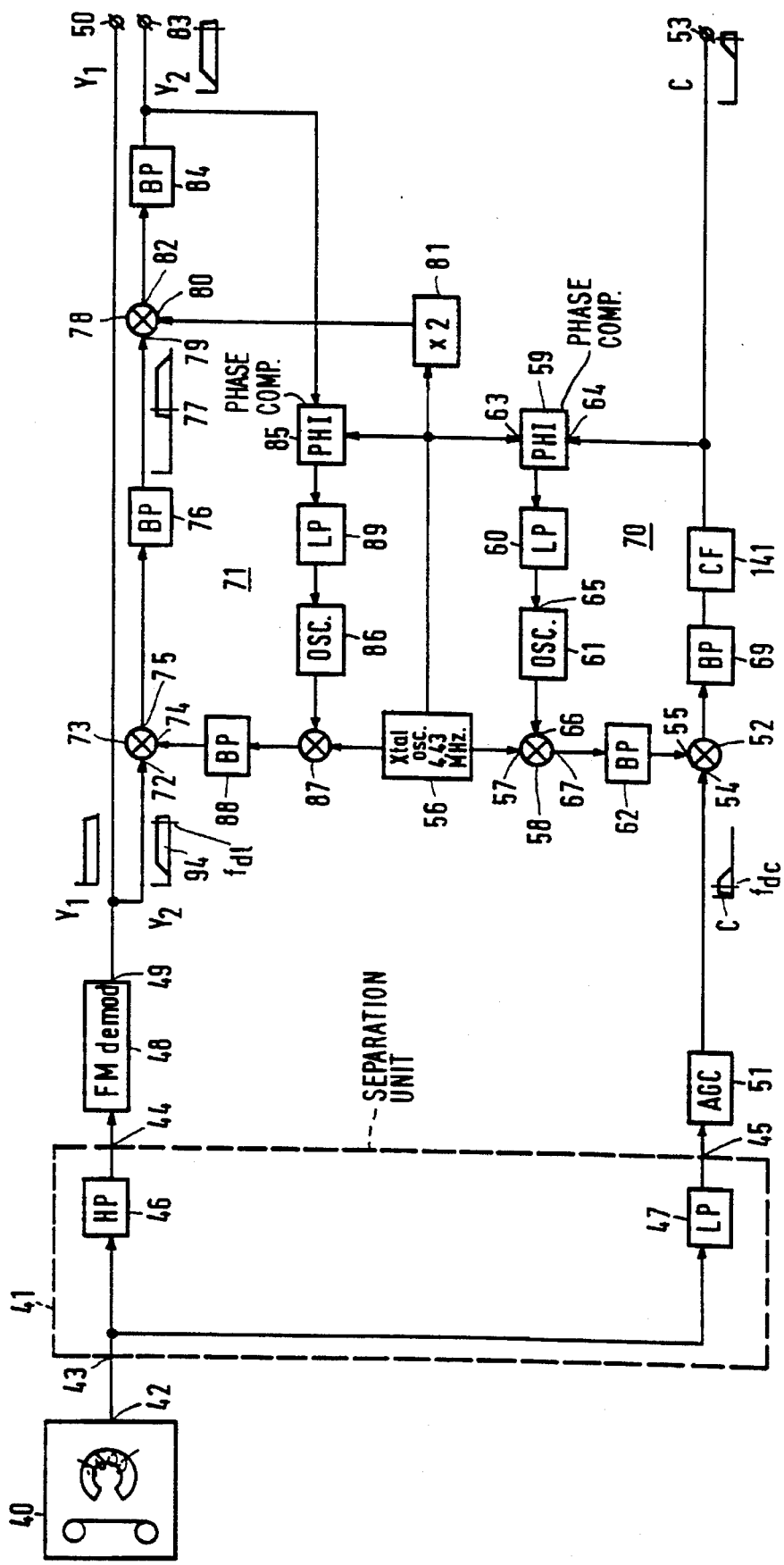
FIG. 4 shows a first exemplary embodiment of a dedicated reproducing device.

In the following, FIG. 3 shows an exemplary embodiment of a recording device according to the first option as stated hereinbefore, in which the second luminance signal is recorded on the record carrier after an FM modulation. FIG. 4 likewise shows an embodiment of a reproducing device with which the video signal thus recorded on the record carrier can be reproduced.

FIG. 3 shows an exemplary embodiment of a device for recording the PAL-PLUS video signal on a magnetic record carrier. In this embodiment an FM-modulated version of the second luminance signal $Y_2$ is recorded in a track on the record carrier. A PAL-PLUS video signal is applied to an input of a separation unit 11 through an input terminal 10. The separation unit 11 is arranged for deriving a (first) luminance signal from the signal applied to its input and presenting this (first) luminance signal at a first output 12 and for deriving a chrominance signal and presenting same at a second output 13. This implies that if a video signal as shown in FIG. 2a1 and 2a2 is applied to the input 14, the luminance signal $Y_1$ appears at the output 12 and the chrominance signal C at the output 13.

If the recording device is in the form of, for example, a VHS video tape recorder, the separation unit 11 comprises, between the input 14 and the output 12, a low-pass filter having a cut-off frequency of about 3.0 MHz and, between the input 14 and the output 13, a band-pass filter having cut-off frequencies of 3.8 and 5 MHz. A luminance signal $Y_1$ then appears at the output 12 in a frequency range from 0–3.0 MHz and a chrominance signal C at the output 13 in a frequency range from 3.8–5 MHz.

If the recording device is in the form of an SVHS video tape recorder, luminance and chrominance comb filters, respectively, are inserted between the input 14 and the outputs 12 and 13. In that case a first luminance signal will appear in a frequency range from 0 to about 5 MHz at the output 12 and a chrominance signal in the frequency range from 3.8–5 MHz at the output 13.

The device comprises a first signal path 15 including an FM modulator 16, and a second signal path 17 including a mixer stage 18 and a low-pass filter 25. The low-pass filter 25 is intended for removing undesired mixing components from the output signal of the mixer stage 18. The output of the signal path 15 is coupled to a first input 19 of a signal combining unit 22. The output of the signal path 17 is coupled to a second input 20 of the signal combining unit 22. An output 21 of the signal combining unit 22 is coupled to an input 23 of writing means 24.

Figure 2C:
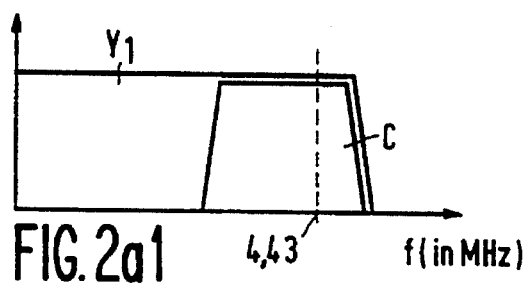
FIG. 2c shows the frequency spectrum of the normal PAL video signal as recorded on a record carrier.
Figure 2C:
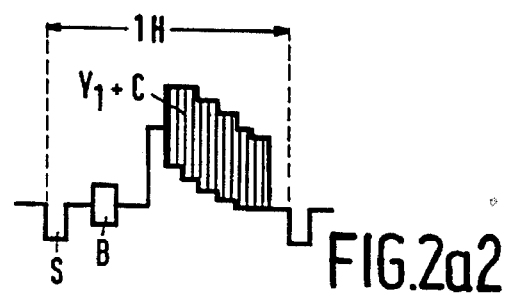
Figure 2C:
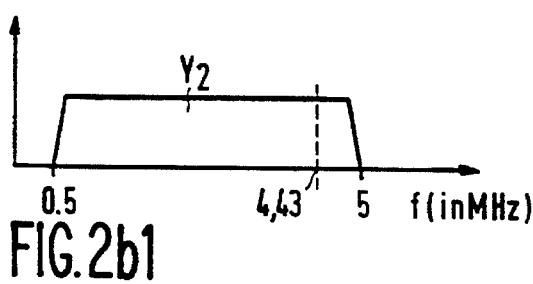
Figure 2C:
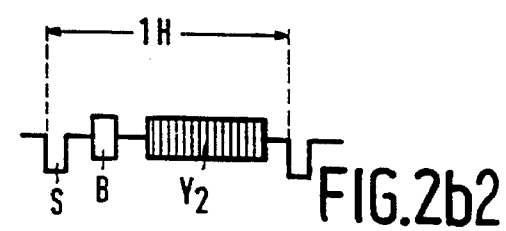
Figure 2C:
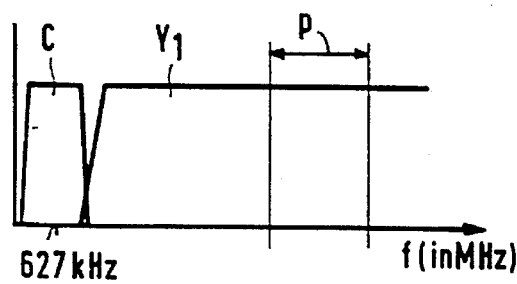

In the mixer stage 18 the chrominance signal C is mixed with a frequency of about 5.06 MHz applied to an input 37 of the mixer stage 18. The mixing frequency is derived in unit 39 in known fashion-from the burst and the sync in the video signal. After the mixing operation the chrominance signal is then situated in a frequency range of ±500 kHz around a carrier having a frequency of 627 kHz, cf. FIG. 2c. In the FM modulator 16 the first luminance signal $Y_1$ is modulated to a frequency range above 1 MHz, cf.. FIG. 2c. The arrow p denotes the frequency swing of the carrier. For a VHS video tape recorder the frequency range of this frequency swing is about 1 MHz wide and is situated between about 3.8 and 4.8 MH. For an SVHS video tape recorder the frequency range is about 1.6 MHz wide and is situated between about 5.4 and 7.0 MHz.

In the signal combining unit 22 the two components are frequency-combined to the signal as represented in FIG. 2c. In the writing means 24 this signal is written in a helical scan-like fashion in tracks running side by side on the record carrier in a direction at an angle to the longitudinal direction of the record carrier.

The input 14 of the separation unit 11 is coupled to a first input 30 of first controllable switching means 26 constituted by a two-way switch. The output 12 of the unit 11 is coupled to a second input 31 of the switching means 26. An output 32 of the switching means 26 is coupled to the input of the signal path 15 via an automatic gain controller 27. The output 13 of the unit 11 is coupled to an input 33 of second controllable switching means 28, an output 34 of which is coupled to the input of the signal path 17 via an automatic gain controller 29. The second switching means 28 are also constituted by a two-way switch.

The third signal path for processing the second luminance signal is formed in the arrangement shown in FIG. 3 by the signal path from the input terminal 10 via the terminal 30 of switch 26, the terminal 32 of this switch, the gain controller 27 and the FM modulator 16 to the input 19 of the signal combining unit 22. The FM modulator 16 in this embodiment is thus shared by the first and third signal paths.

In response to a control signal as applied to the switch 26 through the control signal input 35, during the presence of the burst and the second luminance signal $Y_2$ in the second lines in the PAL-PLUS video signal, and during the presence of the burst in the first lines, the switch 26 is in a state in which input 30 is connected to output 32. As a result, the second luminance signal in the second lines appears at the output 32 unmodified and is not processed in the luminance separation filter in the separation unit 11 and furthermore all bursts are passed. During the presence of the first luminance signal in the first lines, the switch 26 is in the state in which input 31 is coupled to output 32. The sync signal in all the lines may be fed to the signal path 15 either through input 30 or input 31. The second luminance signal $Y_2$ is then modulated in the FM modulator 16 in identical manner to the first luminance signal $Y_1$. Thus, subsequent to FM modulation, the second luminance signal ends up in the frequency range above about 1 MHz and may then be recorded in a track on the record carrier by the unit 24. In response to the control signal as applied to the control signal input 36 of the switch 28, during the first lines and during the occurrence of the bursts B in the second lines of the video signal, the switch 28 is in the state in which input 33 is coupled to output 34. During the presence of the second luminance signal in the second lines the switch is opened. The reason for passing the bursts in the second lines through the signal paths 15 and 17 is that the phase-locked loops present remain locked during reproduction.

Though not represented in FIG. 3, a delay line may be inserted in the branch from the input terminal 10 to the input 30 of switch 26 in order to compensate for the delay differences developing between C and $Y_1$, on the one hand, and $Y_2$, on the other, due to the processing of C and $Y_1$ in the separation unit 11.

It should be observed in this context that the exemplary embodiment shown in FIG. 3 may be changed in that the input 31 of switch 26 is coupled to the output 13 of unit 11, and that the output 32 of the switch 26 is coupled to the input of the AGC unit 29. This is shown, for example, in the exemplary embodiment of FIG. 5 to be discussed hereinafter. In addition, between the output of the AGC unit 29 and the input of the mixer stage 18 a branch is inserted to a switch located before the FM modulator 16 in the first signal path, such as switch 90 in FIG. 5, so that the second luminance signal can again be applied to the FM modulator 16.

FIG. 4 shows a reproducing device with which the PAL-PLUS video signal, as recorded with the device shown in FIG. 3, may be reproduced. The FM demodulators in the first and third signal paths of the device shown in FIG. 4 are shared so that a single FM alemodulator will suffice. The device comprises reading means 40 for reading the information recorded on the record carrier. An output 42 of the reading means is coupled to an input 43 of a separation unit 41. The separation unit 41 is arranged for deriving the first luminance signal $Y_1$ from the signal read from the record carrier, and for applying this luminance signal to a first output 44. The unit 41 thereto comprises a high-pass filter 46 having a cut-off frequency of about 1 MHz. Because the second luminance signal $Y_2$ after recording is situated in the same frequency range as the first luminance signal, both the first and second luminance signals present in the first and second lines respectively, in the video signal will appear at the output 44. The separation unit 41 is further arranged for deriving the chrominance signal C from the information that has been read out and for applying this chrominance signal to an output 45. For this purpose, the unit 41 comprises a low-pass filter 47 having a cut-off frequency of about 1 MHz.

The output 44 of the unit 41 is coupled to an input of an FM demodulator 48. In the demodulator 48 the effect of the modulation in the FM modulator 16 in the recording device is eliminated. At the output 49 of the demodulator 48 the original first luminance signal $Y_1$ appears again in the first lines and the second luminance signal $Y_2$ in the second lines. The output 49 is coupled to a first output terminal 50 of the device to which the first luminance signal is applied for further processing. The output 45 of the unit 41 is coupled to a second output terminal 53 via an automatic gain controller 51 and a mixer stage 52. In the mixer stage 52 the chrominance signal C is mixed with a frequency so that again the original chrominance signal modulated on the fixed carrier is obtained having a frequency of 4.43 MHz. After band-pass filtering in the band-pass filter 69, in which disturbing modulation components are filtered out, the chrominance signal is presented for further processing at a second output terminal 53 through a comb filter 141. The comb filter 14 1 is intended for suppressing cross-talk from adjacent tracks.

The chrominance signal C is applied to an input 54 of the mixer stage 52 and is modulated on a carrier $f_{dc}$ which is no longer exactly equal to 627 kHz due to the time errors developed during the reading operation. However, a chrominance signal modulated on a fixed carrier having a frequency of 4.43 MHz is to be presented at the output terminal 53. For this purpose, a mixing frequency of 4.43 MHz+$f_{dc}$ is applied to a second input 55 of the mixer stage. This mixing frequency is obtained in known fashion by means of a circuit 70 formed by a frequency oscillator 56, a phase comparator 59, a low-pass filter 60, a variable oscillator 61, a mixer stage 58 and a band-pass filter 62. The oscillator 56 applies a fixed frequency of 4.43 MHz to an input 57 of a mixer stage 58 and to an input 63 of the phase comparator 59. The phase comparator compares the 4.43 MHz frequency of the oscillator 56 with the burst frequency presented at an input 64. A difference signal generated by the phase comparator 59 is applied as a control signal to the control signal input 65 of the oscillator 61 through the low-pass filter 60. In response to this control signal the oscillator 61 generates at its output a frequency of $f_{dc}$ which is applied to an input 66 of the mixer stage 58. A frequency of 4.43 MHz±$f_{dc}$ then appears at the output 67 of the mixer stage 58. The sum frequency is passed to the second input 55 of the mixer stage 52 by the band-pass filter 62. By mixing the chrominance signal with this mixing frequency, a frequency-shifted chrominance signal is obtained on the desired fixed carrier of 4.43 MHz.

The suppressed carrier $f_{dl}$ of the second luminance signal $Y_2$ in the second lines of the video signal now no longer has the fixed value of 4.43 MHz, cf. the curve $Y_2$ denoted 94 in FIG. 4, also due to the time errors developed during the reading operation. The second luminance signal thus needs a correction similar to the one applied to the chrominance signal by means of the circuit 70 in conjunction with the mixer stage 52. For this purpose, the output 49 of the FM demodulator 48 is coupled to a circuit 71, that is to say, a first input 72 of a first mixer stage 73. A frequency of 4.43 MHz+$f_{dl}$ is applied to a second input 74 of the mixer stage 73. At the output 75 of the mixer stage 73 the second luminance signal $Y_2$ then appears modulated on a fixed carrier of 4.43 MHz. The frequency spectrum of the second luminance signal, however, is frequency inverted as is shown by the curve 77 in FIG. 4. After being in the band-pass filter 76 in which disturbing modulation components are filtered out, the signal is then applied to a first input 79 of a second mixer stage 78. A second input 80 of this mixer stage 78 is supplied with a frequency of 8.86 Mhz obtained in the multiplier 81, which has multiplied the oscillation frequency of the oscillator 56 by two. Subsequent to band-pass filtering in the band-pass filter 84, for filtering out undesired mixing frequencies, the original second luminance signal $Y_2$ then appears at the output 83 for further processing. In the phase comparator 85 the frequency of the burst is compared with the fixed 4.43 MHz frequency of the oscillator 56. The output signal of this comparator 85 drives, through a low-pass filter 89, a variable oscillator 86, which applies a frequency equal to $f_{dl}$ to the mixer stage 87. Once undesired mixing frequency components have been filtered out in the band-pass filter 88, the frequency of 4.43 MHz+$f_{dl}$ is presented at the second input 74 of the mixer stage 73. The first signal path in the device of FIG. 4 is thus formed by the path leading from the output 44 of the separation unit 41, via the demodulator 48 to the output terminal 50. The second signal path is formed by the path leading from the output 45, via the gain controller 51 and the mixer stage 52 to the output terminal 53. The third signal path is formed by the path leading from the output 44 via the demodulator 48 and the mixer stages 73 and 78 to the output terminal 83. Delay lines and switches may be coupled, as desired, to one or more of the output terminals 50, 53 and 83, so as to correctly position with time the two luminance signals and the one chrominance signal relative to each other, to do away with undesired signals, and to combine the signals again.

It should be observed in this respect that this reproducing device may alternatively comprise only a single mixer stage in the third signal path, that is, the mixer stage 73. By mixing the second luminance signal in this mixer stage 73 with a frequency of, for example, $f_{dl}$, this luminance signal is demodulated directly to the baseband. The elements 78, 84, 87, 88 and 81 are then absent. The filter 76 then has a different filter characteristic and the phase loop 71 is different in that the output of the oscillator 86 has a direct coupling to the input 74 of the mixer stage 73 and the output of the FM demodulator 48 has a direct coupling to both the input 72 of the mixer stage 73 and the one input of the phase comparator 85, and in that the other input of phase comparator 85 is coupled to the output of the oscillator 86.

From the above-discussed exemplary embodiments it will be apparent that the mixer stage(s) located in the third signal paths of the recording and reproducing system is (are both) located in the third signal path of the reproducing device for processing the second luminance signal.

Hereinbelow, two exemplary embodiments (FIGS. 5 and 7) of recording devices according to the second option as explained above will be discussed hereinbelow, in which the second luminance signal is written on a record carrier after the signal has been mixed to a different frequency range and after an FM modulation. Then, two exemplary embodiments (FIGS. 6 and 8) of a reproducing device will be discussed by means of which the video signal thus recorded on the record carrier may be read out. In the exemplary embodiments shown in FIGS. 5 and 7 the second luminance signal $Y_2$ is first converted to another frequency range, after which it is FM modulated and recorded on the record carrier. The mixing frequency may be an arbitrary frequency. A separate mixer stage may be used for this purpose, cf. the mixer stage 130 in FIG. 7. Alternatively, the mixing frequency may also be assumed to be equal to the 627 kHz carrier of the chrominance signal C. In that case, the mixer stage 18 already available in the second signal path (cf. FIG. 5) will then preferably be used. However, also with a shared mixer stage a mixing operation with a different frequency than 627 kHz in the mixer stage 18 is possible, that is, by changing the mixing frequency supplied by unit 39 in the mixer stage 18.

Figure 5:
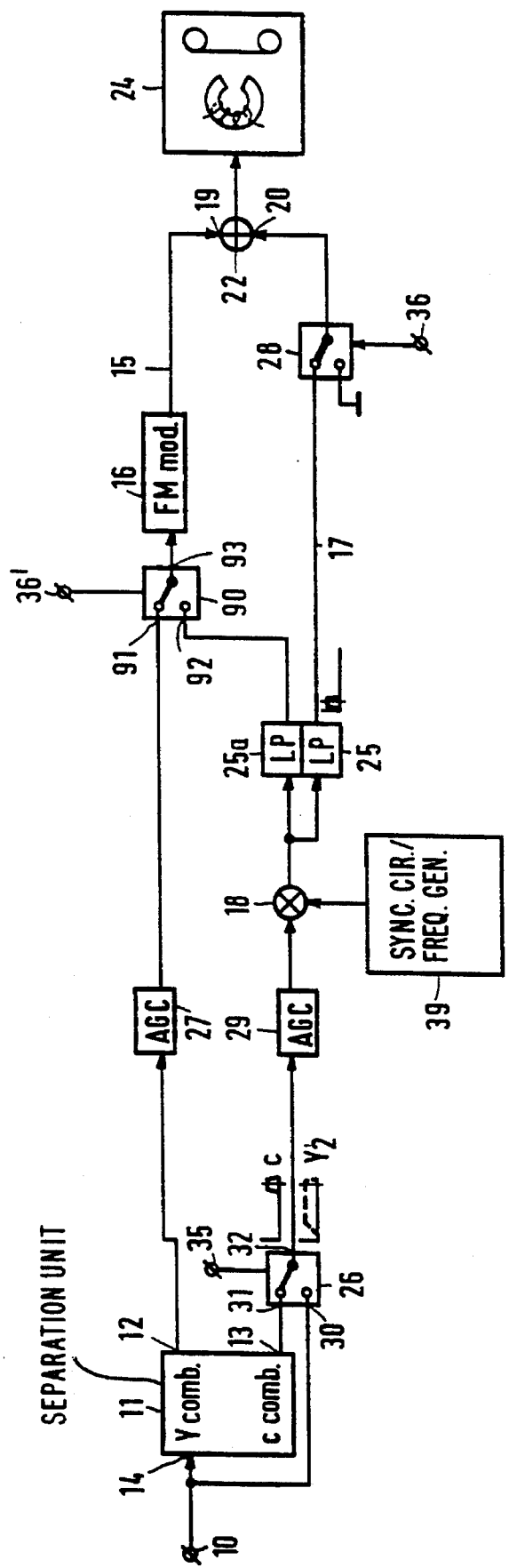
FIG. 5 shows a second exemplary embodiment of a recording device.

The device shown in FIG. 5 comprises a switch 26 inserted between the output at 13 of the separation unit 11 and the gain controller 29. The branch from the second signal path 17 to a terminal 92 of a switch 90 in the first signal path 15, used for transferring the second luminance signal to the path 15, is situated behind the mixer stage 18. There is a switch 28 after the mixer stage 18, that is, after the branch from the second to the first signal path.

The operation of the switch 28 shown in FIG. 5 is similar to the operation of the switch 28 shown in FIG. 3.

In response to a control signal applied to the input 36', the switch 90 is in the state in which the input 92 is connected to the output 93 during the presence of the second luminance signal in the second lines and during the bursts in the first and second lines, and the switch is in the other state for the remaining period of time.

In response to the control signal applied to the input 35, the switch 26 is in the state in which input 30 is connected to output 32 during the presence of the second luminance signal in the second lines. During the absence of the chrominance signal the switch is in the other state. The bursts in all of the lines are preferably passed to the mixer stage 18 through the switch input 31. The sync signals in all of the lines must not be applied to the second input 20 of the signal combining unit 22. Either switch 26 or switch 28 may be used for achieving this.

The second luminance signal $Y_2$ in the second lines is frequency shifted and inverted in the mixer stage 18. The suppressed carrier is now situated at a specific frequency, for example, 627 kHz. The signal thus obtained is applied to the FM modulator 16 through the low-pass filter 25 in which undesired mixing components are filtered out. The second luminance signal thus obtained is FM modulated and recorded on the record carrier. It should be observed in this respect that where the second luminance signal is mixed with a different frequency from the chrominance signal mixing frequency, the bursts in all the lines are mixed with the mixing frequency with which the chrominance signal is mixed.

In this exemplary embodiment the third signal path is formed by the path leading from the input terminal 10, through the terminals 30 and 32 of the switch 26, the mixer stage 18, the low-pass filter 25a, the terminals 92 and 93 of the switch 90 and the modulator 16 to the input 19 of the signal combining unit 22.

Figure 6:
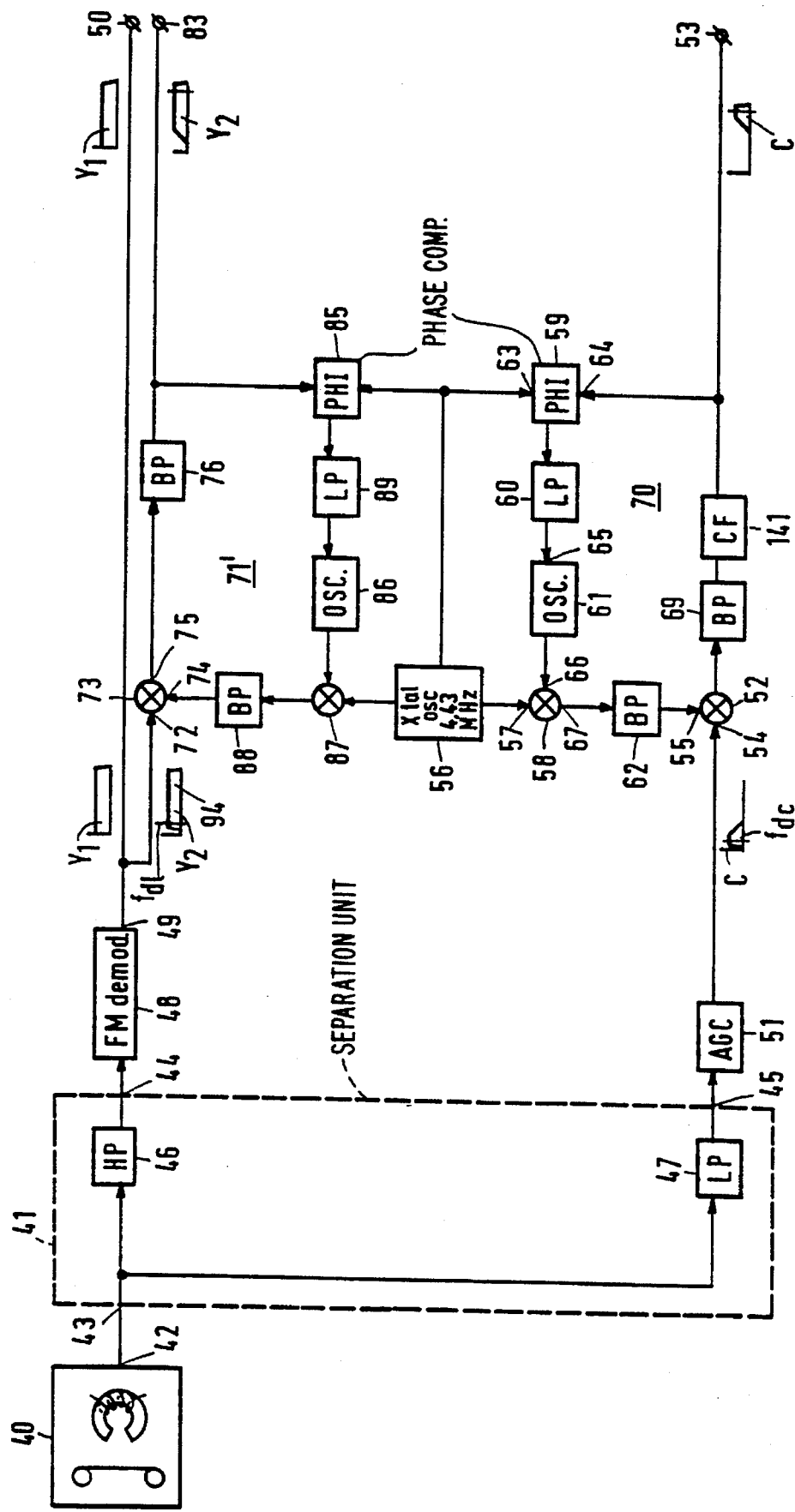
FIG. 6 shows a second exemplary embodiment of the reproducing device.

FIG. 6 shows a reproducing device with which the information recorded on the record carrier by means of the device shown in FIG. 5 may be reproduced. The device presents great similarity to the one shown in FIG. 4. The signal processing of the first luminance signal $Y_1$ and a chrominance signal C is identical. At the output of the demodulator the second luminance signal $Y_2$ in the second lines has a frequency spectrum as shown by the curve 120 in FIG. 6. The second luminance signal is situated on a carrier of, for example, about 627 kHz. Thus, the only operation that needs doing is a mixing in the mixer stage 73 to a fixed carrier frequency of 4.43 MHz. Such a mixing operation is completely identical with the mixing operation performed with the chrominance signal C in the circuit 70. For this purpose, a mixing frequency of 4.43 MHZ+$f_{dl}$ is applied to the second input 74 of the mixer stage 73. Because the frequency spectrum of the second luminance signal in the mixer stage 18 of the device shown in FIG. 5 is inverted, the frequency spectrum of the second luminance signal $Y_2$ is to be inverted back to its original shape after the mixing operation in the mixer stage 73.

Figure 7:
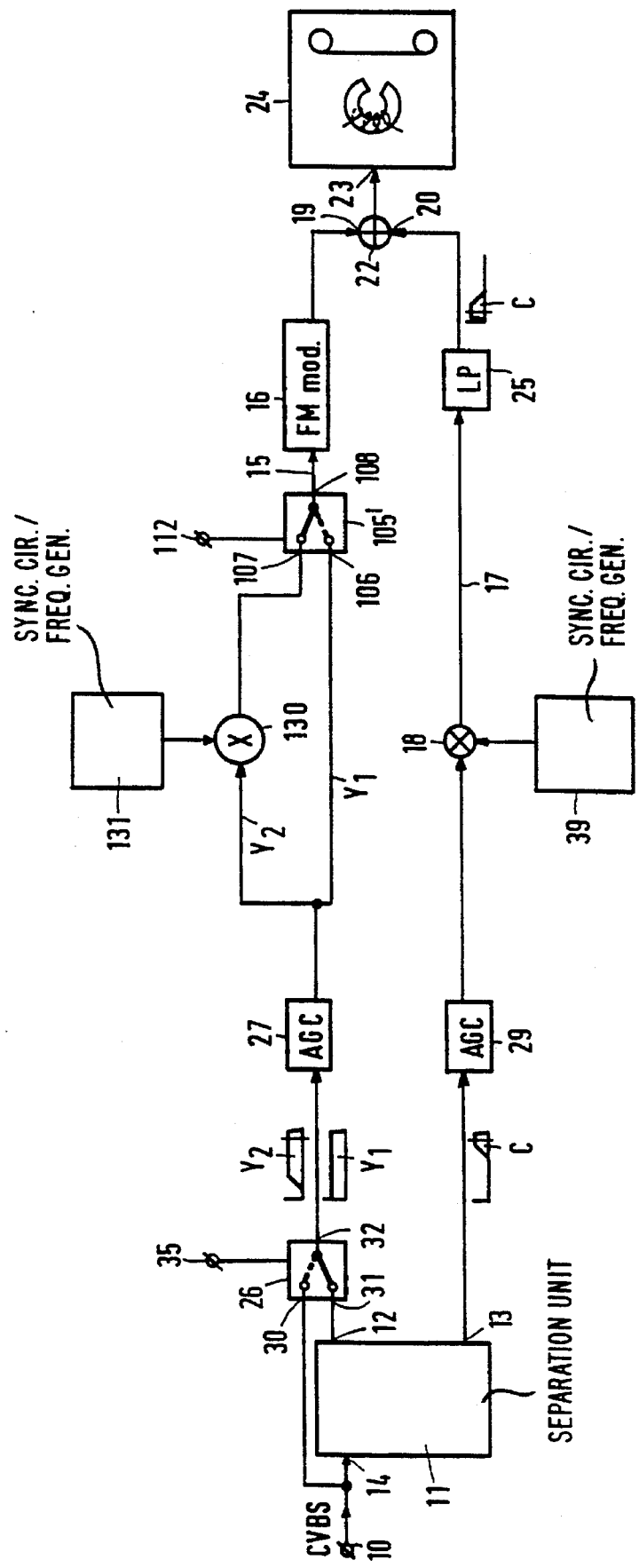
FIG. 7 shows a third exemplary embodiment of a recording device.

FIG. 7 shows a recording device to be used in lieu of the device shown in FIG. 5 for recording a PAL-PLUS video signal. Also in this case the second luminance signal $Y_2$ is first converted to a different carrier frequency, then FM modulated, after which it is recorded on the record carrier. For the conversion to the different carrier frequency, use is made of a separate mixer stage 130 inserted between the output of the gain controller 27 and the input 107 of controllable switching means 105', constituted by a switch. The reason for using a separate mixer stage for the second luminance signal is that the chroma carrier used in the mixer stage 18 for mixing the chrominance signal for example, for each consecutive line in the video signal is to be phase shifted through 90°. However, this is not necessary for mixing the second luminance signal.

The mixing frequency with which the second luminance signal is mixed in the mixer stage 130, and which is produced by a source 131, may again be the same as the mixing frequency of mixer stage 18. A different mixing frequency could also be selected as required.

The operation of the switch 26 in response to the control signal is again the same as that discussed with respect to FIG. 3.

The controllable switch 105' operates in such a way that the input 107 is connected, in response to the control signal, to the output 108 during the presence of the second luminance signal in the second lines, and during the presence of the bursts in the first and second lines in the video signal. For the remaining period of time the switch is in another state. The device shown in FIG. 6 may again be used as a reproducing device.

If the second luminance signal and the burst have different modulations during recording, oscillator 86 in FIG. 6 has a different frequency from oscillator 61. If the second luminance signal and the burst are mixed with the same frequency during recording, the frequencies of the oscillators 86 and 61 are equal.

If the second luminance signal $Y_2$ in the recording device shown in FIG. 5 or 7 is mixed with the same frequency as used for mixing the chrominance signal, or with a frequency derived therefrom, a simplification of the reproducing device shown in FIG. 6 is possible. This simplification is shown in the reproducing device of FIG. 8. The device comprises first controllable switching means 150 constituted by a switch having a first input 151 coupled to the output of the FM demodulator 48, and a second input 152 coupled to the output of the AGC unit 51, and an output 153 coupled to the input 54 of the mixer stage 52.

In response to a control signal applied to the control signal input 159 of the switch 150, this switch is in the state in which input 151 is connected to output 153 during the presence of the second luminance signal in the second lines in the video signal. During the presence of the chrominance signal in the first lines, the switch is in the state shown in the drawing Figure. During the bursts and sync signals in the first and second lines, the switch 150 is preferably in the bottom state.

The exemplary embodiments discussed so far with respect to FIGS. 5, 6, 7 and 8 have clarified that from the two mixer stages located in the third signal paths of the recording and reproducing system, for processing the second luminance signal, one mixer stage is located in the third signal path of the recording device, and one mixer stage is located in the third signal path of the reproducing device.

Figure 19:
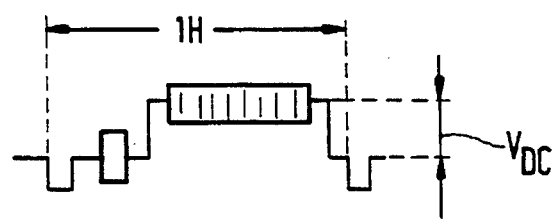
FIG. 19 shows the second luminance signal with a DC voltage VDC added.

It should be further noted that the second luminance signal $Y_2$ in the embodiments of FIGS. 5 and 7, is preferably additionally processed in the sense that a DC voltage $V_{DC}$ is added to the second luminance signal, see FIG. 19. The reason is that otherwise large signal components in the second luminance signal could lead to a detection of false syncs in the sync separator, which is present in the recording and the reproducing device.

The adding of a DC voltage to the second luminance signal can be realized by means of a signal adding circuit (not shown) that can be included in one of the two input paths to the mixer stages 18 and 130 in FIGS. 5 or 7, respectively, or in the output path of said mixer stages.

The DC voltage $V_{DC}$ should have a value such that the lowest signal values of $Y_2$ are larger than the black level. $V_{DC}$ is for instance 350 mV, which is a DC level of 50% (half grey).

Figure 8:
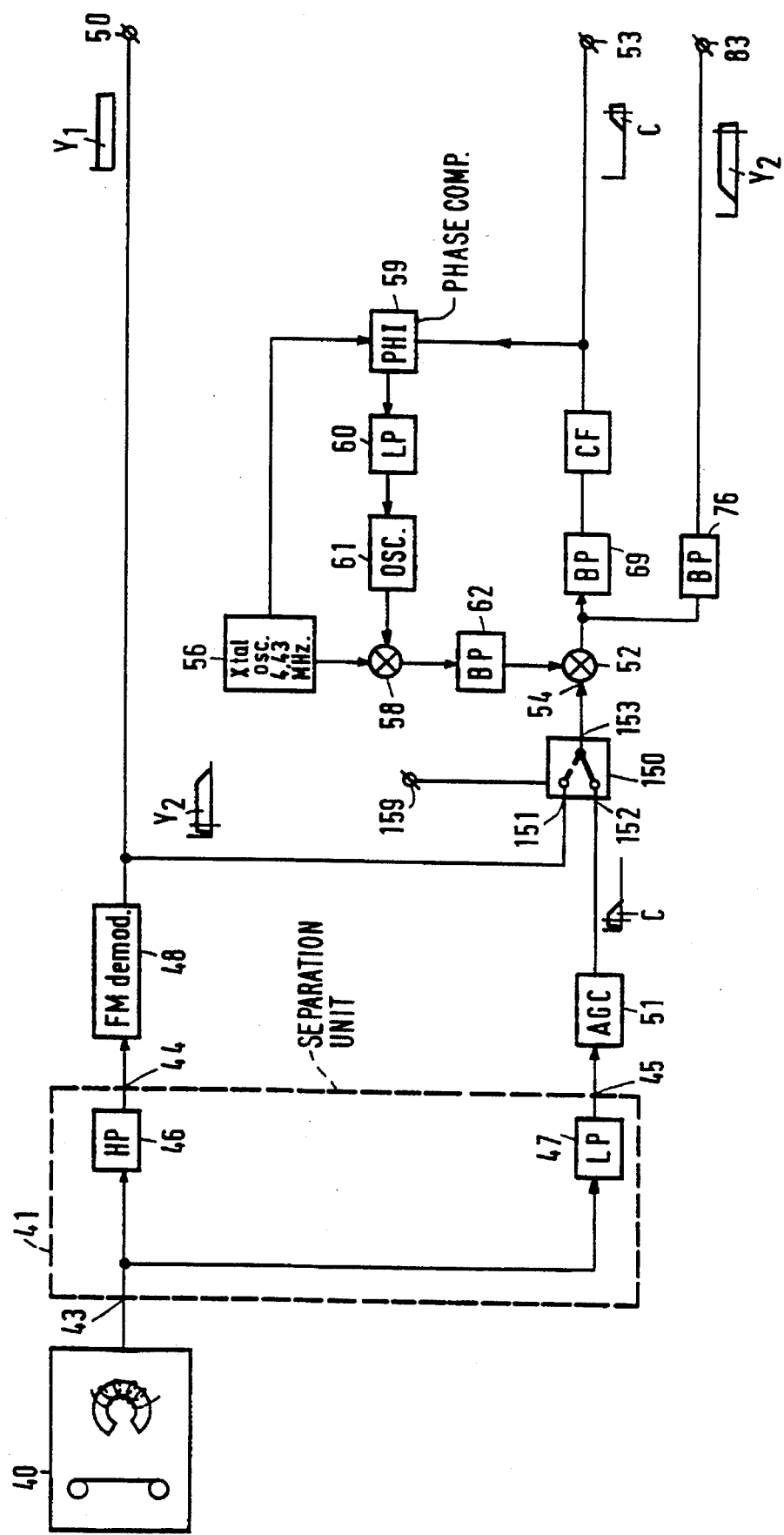
FIG. 8 shows a third exemplary embodiment of a reproducing device.

At the reproduction side, that is in the embodiments of FIGS. 6 and 8, the inverse signal processing should be carried out. That means that the same DC voltage $V_{DC}$ should be subtracted from the second luminance signal $Y_2$. This can be realized by including a signal subtracting circuit (not shown) in one of the two input paths of the mixer stages 73 and 52 in FIGS. 6 or 8, respectively, or in the output path of said mixer stages.

It should be noted that the adding and subtracting of the DC voltage to/from the second luminance signal $Y_2$ should only be applied to the second luminance signal $Y_2$ as it is present in the second lines. The adding and subtraction circuits are inhibited during the first lines of the video signal.

A problem that might occur during reproduction is, that the level for half grey is not known any more. This could mean that the inverse signal processing by means of the subtracting circuit could lead to a regenerated second luminance signal having an erroneous DC level. In order to preclude such a situation, level information concerning the exact level of half grey could be transmitted together with the video signal. Upon reproduction this level information can be detected and used to bring the reproduced second luminance signal at its correct DC level.

Another possibility is not to bring the second luminance signal back to its original level, but to apply the level information together with the reproduced video signal to a PAL-PLUS decoder, in which the second luminance signal is brought back to its original level in the PAL-PLUS decoding step.

Figure 9:
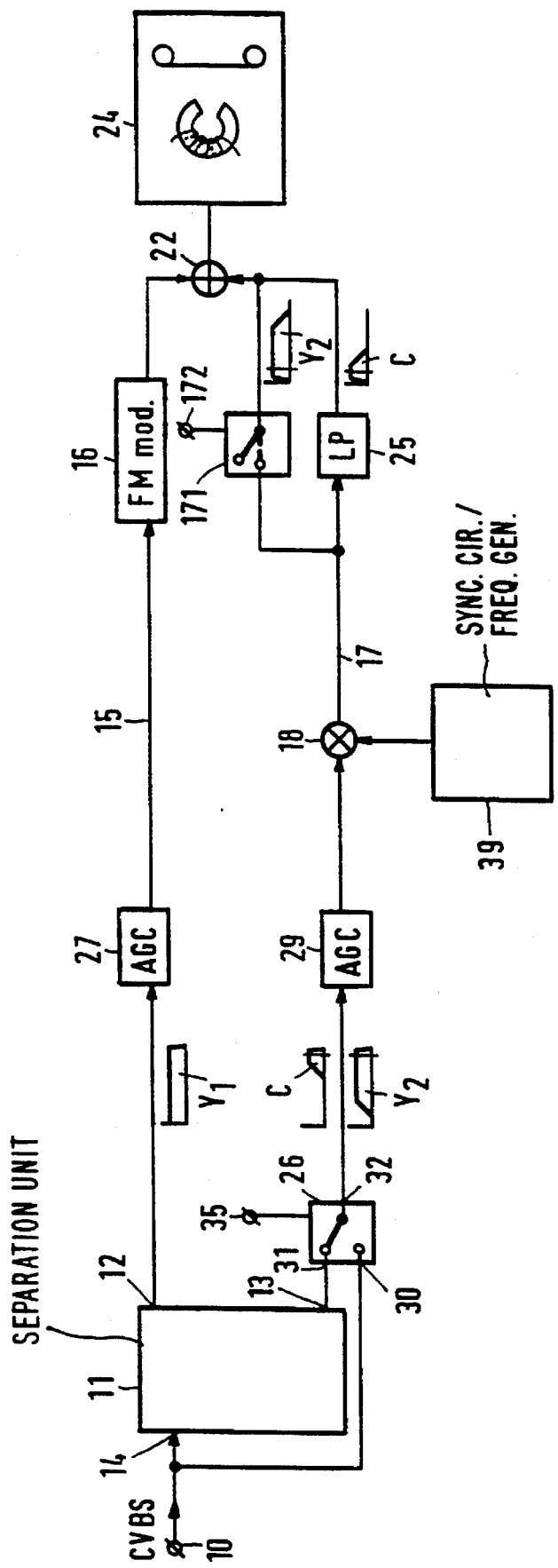
FIG. 9 shows a fourth exemplary embodiment of a recording device.

In FIG. 9 is shown an exemplary embodiment of a recording device according to the third option as stated above, in which the second luminance signal is also mixed with a certain frequency, after which the second luminance signal mixed to a different frequency range is recorded directly. This will be followed by an exemplary embodiment (in FIG. 10) of a reproducing device with which the video signal thus recorded on the record carrier may be read out.

Figure 2D:
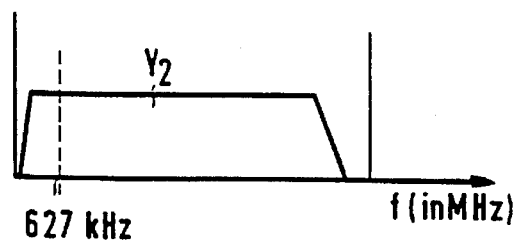
FIG. 2d shows the frequency spectrum of the second luminance signal as recorded in a wide band on the record carrier.

FIG. 9 shows the recording device in which the second luminance signal $Y_2$ is mixed in mixer stage 18 and then recorded on the record earlier in a wide-band frequency range. The second luminance signal $Y_2$ is thus recorded with a frequency spectrum as shown in FIG. 2d on the record carrier during the second video lines. A carrier frequency corresponding to black (cf. FIG. 2d) then leaves the FM modulator 16, so that the whole frequency range of the storage medium may be used for recording the second luminance signal $Y_2$. During the first video lines the signal having the characteristic of FIG. 2e is recorded. The switching means 26 are included in the circuit leading from the second output 13 of unit 11 to the second signal path 17. The operation of the switch 26 is again similar to that of this switch in the device shown in FIG. 5. The device further includes switching means 171 in the form of a controllable switch for switching off the filtering operation of the low-pass filter 25. This switch bridges the filter 25. The operation of the switch 171 is as follows. Switch 171 is closed in response to the control signal at a control signal input 172 during the presence of the second luminance signal is open during the presence of the chrominance signal and preferably is also open when the sync signals and bursts occur in all of the lines. Thus, the wide-band signal for the second luminance signal $Y_2$ as shown in FIG. 2d, which wide-band signal is obtained after the mixing operation in the mixer stage 18, may be applied directly to the recording unit 24 without passing through the low-pass filter 25.

Figure 10:
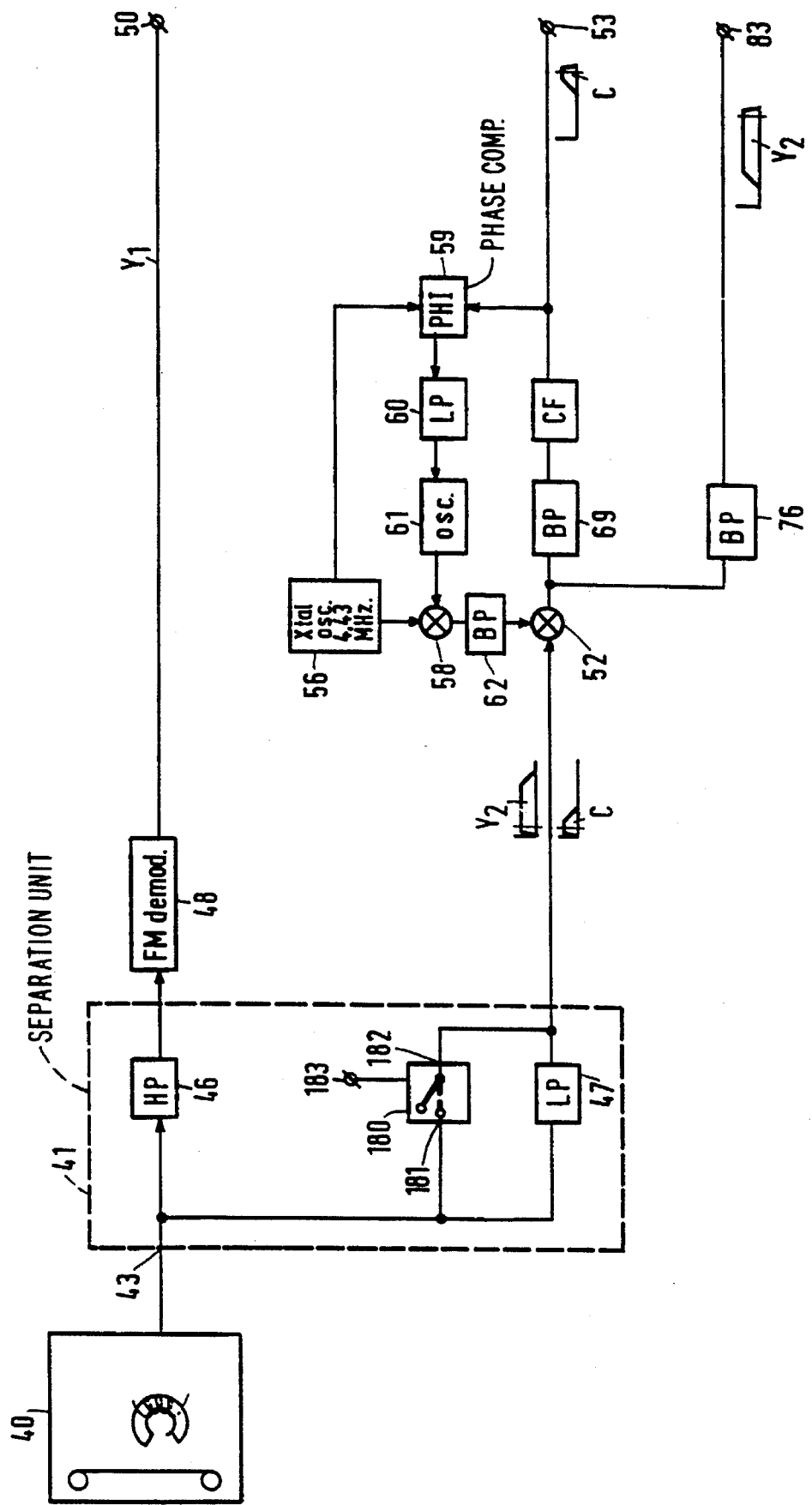
FIG. 10 shows a fourth exemplary embodiment of a reproducing device.

FIG. 10 shows an exemplary embodiment of a reproducing device for reading information recorded by the device shown in FIG. 9 from the record carrier. The separation unit 41 in this structure further includes bridging means 180 which may bridge the low-pass filter 47. These bridging means 180 are constituted by a controllable switch which operates in similar fashion to the switch 171 in FIG. 9 in response to the control signal applied to the control signal input 183. The wide band second luminance signal $Y_2$ in these second lines may reach the mixer stage 52 without passing through the filter 47.

In the exemplary embodiments shown in FIGS. 9 and 10 and discussed hereinbefore it is apparent that from the two mixer stages included in the third signal paths of the recording and reproducing system, for the processing of the second luminance signal, there is one mixer stage in the third signal path of the recording device and one mixer stage in the third signal path of the reproducing device.

It should further be observed that similar to the exemplary embodiments shown in FIGS. 5 and 7, also the exemplary embodiment shown in FIG. 9 may comprise two mixer stages or a switching mixer stage to be used for mixing the second luminance signal with another mixing frequency. A similar line of thought also holds for the reproducing device shown in FIG. 10.

Figure 11:
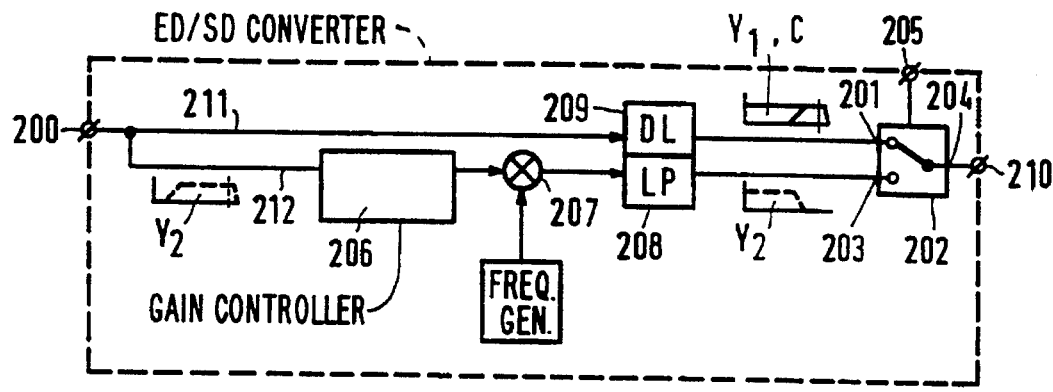
FIGS. 11 and 13 show the converter means for converting a PAL-PLUS video signal to a signal suitable for recording by an (S)VHS video tape recorder.
Figure 12:
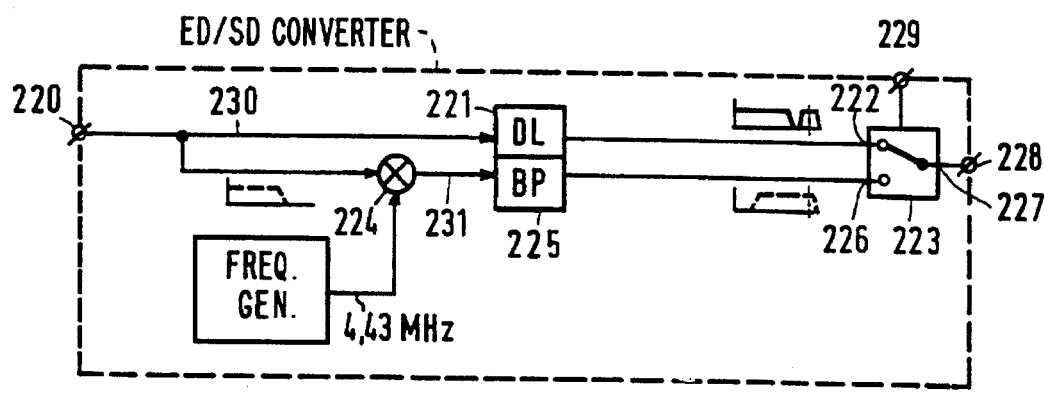
FIGS. 12, 14 and 15 show the converter means for converting a signal reproduced by an (S)VHS video tape recorder to a PAL-PLUS video signal.

With the converter means shown in FIGS. 11 and 12 it is possible to record a PAL-PLUS video signal on a standard (S)VHS tape recorder and to derive the second luminance signal from the signal reproduced by the video tape recorder. For recording the converter means shown in FIG. 11 is to be connected to the CVBS input of the (S)VHS video tape recorder. For reproduction the converter means shown in FIG. 12 is to be connected to the CVBS output of the (S)VHS video tape recorder. The PAL-PLUS video signal is presented at the input terminal 200 of the converter means shown in FIG. 11. The terminal 200 is coupled to a first input 201 of controllable switching means 202 via a delay line 209, and to a second input 203 of the switching means 202 (constituted by a switch) via a gain controller 206, a mixer stage 207 and a low-pass filter 208. The output 204 of the switch 202 is coupled to the output terminal 210 of the converter means. In response to a control signal applied to the control signal input 205, the switch 202 is in the state in which the input 203 is connected to the output 204 during the presence of the second luminance signal in the second lines in the video signal. In the absence thereof, the switch is in the other state. This means that the chroma bursts in all the lines are applied to the output 210 through the path 211. During the second video lines the second luminance signal is passed through the signal path 212. A mixing operation is performed with a frequency, for example, equal to 4.43 MHz, in the mixer stage 207. This mixing operation causes the second luminance signal to be mirror inverted and frequency shifted. Subsequent to low-pass filtering in the filter 208, during which undesired mixing components are filtered out, the thus obtained signal is applied to the input 203 of the switch 202. The signal at the output terminal 210 is situated in a frequency range such that it can be recorded by a VHS or SVHS video tape recorder.

During reproduction, this video signal is again read out and applied to the input terminal 220 of the converter means shown in FIG. 12. The terminal 220 is coupled to a first input 222 of controllable switching means 223 through a delay line 221, and to a second input 226 of the switching means 223 (constituted by a switch) through a mixer stage 224 and a band-pass filter 225. The output 227 of the switch 223 is coupled to the output terminal 228 of the converter means. In response to a control signal applied to the control signal input 229 the switch 223, similar to the switch 202, has the bottom state only during the presence of the second luminance signal. During the first video lines the first luminance signal and the chrominance signal are passed through the signal path 230 unmodified. During the second video lines the second luminance signal is passed through the signal path 231. A mixing operation is performed in mixer stage 224 with a frequency, for example, equal to 4.43 MHz. As a result of the mixing in the mixer stage 224, the second luminance signal $Y_2$ is again reset to the original frequency range shown in FIGS. 2b1 and 2b2. Subsequent to band-pass filtering in the band-pass filter 225, in which undesired mixing components are filtered out, the thus obtained signal is applied to the terminal 226 of the switch 223. The signal at the output terminal 228 is again the PAL-PLUS video signal which may be applied to the CVBS input of the television set.

The converter means shown in FIGS. 11 and 12 are used for realizing the recording and reproducing system according to the second option, in which the second luminance signal is first mixed and then FM modulated prior to being recorded. The FM modulation is effected in the VHS video tape recorder.

Figure 13:
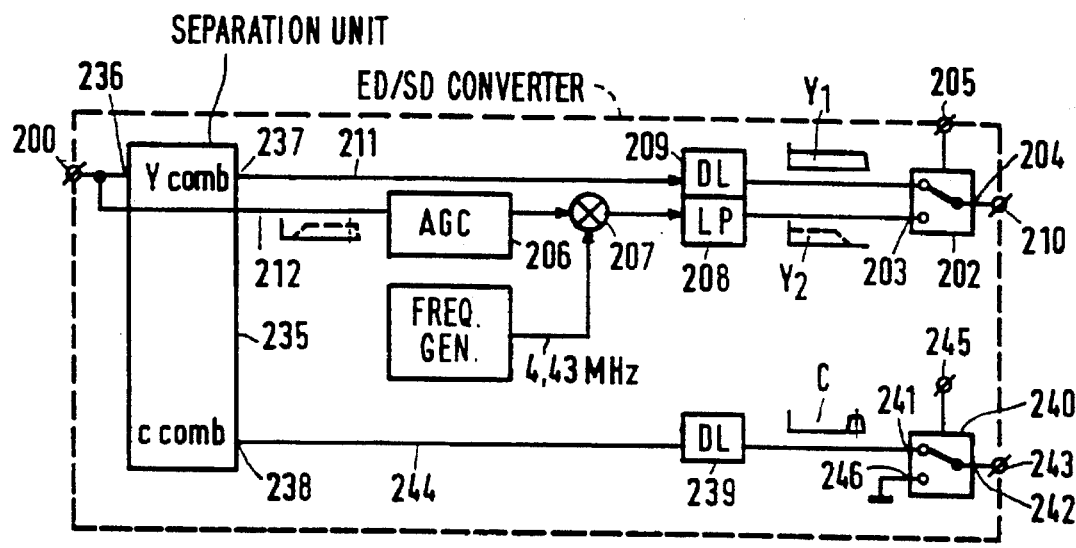

FIG. 13 shows an extension of the converter means shown in FIG. 11 in which the converter means furthermore includes a separation unit 235, which has an input 236 coupled to the terminal 200, an output 237 coupled to the signal path 211 and an output 238 coupled to a signal path 244. The signal path 244 furthermore includes a delay line 239 and a controllable switch 240 and is coupled to an output terminal 243. The outputs 210 and 243 may be applied to the Y or C input, respectively, of an SVHS video tape recorder. The separation unit 235 derives the first luminance signal $Y_1$ and the chrominance signal C from the input signal and applies these luminance and chrominance signals to the output 237 or 238, respectively. The first luminance signal is applied to the terminal 210 over the signal path 211 in a fashion described with reference to FIG. 11. The second luminance signal is applied to the terminal 210 through the signal path 212 which has a direct link to the terminal 200. The processing in the signal path 212 of the luminance signal $Y_2$ is equal to the processing described with reference to FIG. 11. The switch 202 operates in such a way that during the absence of $Y_2$, and preferably also during the presence of the bursts in the first and second lines of the video signal, the terminals 203 and 204 are connected to each other. The chrominance signal is applied to the terminal 243 over the signal path 244. In response to the control signal applied to the control signal input 245, during the presence of the chrominance signal in the first lines and during the presence of the bursts in the first and second lines of the video signal, the switch 240 is in the state in which the input 241 is connected to the output 242. During the presence of $Y_2$ in the second lines, the switch 240 is in a state in which the input 246 is connected to the output 242.

The signals Y and C at the output terminals 210 and 243 are applied to the Y and C inputs of an SVHS video tape recorder and are recorded by this video tape recorder.

Figure 14:
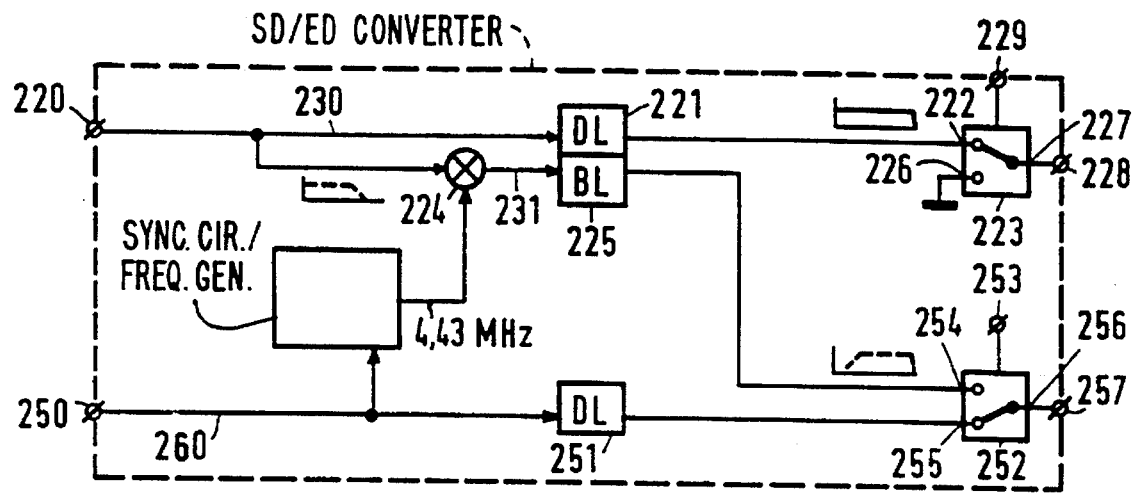

When reproduced, this video signal is again read out and presented to the input terminals 220 and 250 of the converter means shown in FIG. 14. The first and second luminance signals are presented to the terminal 220 and the chrominance signal to the terminal 250. The converter means shown in FIG. 14 comprises a signal path 260 from the input terminal 250 to an output terminal 257. In this signal path there is a delay line 251 and controllable switching means 252. The second luminance signal is fed to the input 254 of the switch 252 after the signal has been mixed. The mixing frequency of, for example, 4.43 MHz is derived from the chroma burst in the signal path 260, while making use of the burst in the signal path 231 as required. In response to the control signal, during the presence of $Y_2$ in the second lines, the switch 252 is in the state in which the input 254 is connected to the output 256, so that the second luminance signal is presented at the output terminal 257 during the second video lines. During the remaining period of time the switch 252 is in the state in which the input 255 is connected to the output 256. The chrominance signal and the bursts in the first and second lines are then presented at the output 257. In the first signal path 230 there is still the controllable switch 223 which, during the presence of $Y_1$ in the first lines and the sync signals in the first and second fines, is in a state in which the input 222 is connected to the output 227 and, during the presence of $Y_2$ and preferably the bursts in the first and second lines, is in another state. The signals at the output terminals 228 and 257 may be fed to the Y and C inputs, respectively, of a television set.

Figure 15:
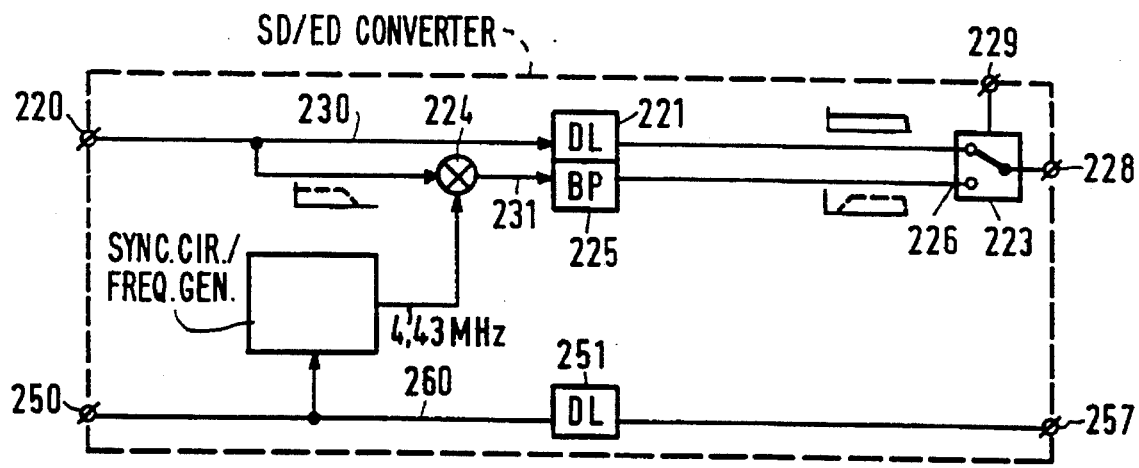

FIG. 15 shows a different converter means which may be used in lieu of the converter means shown in FIG. 14. The difference is to be found in the fact that the output of the filter 225 is now coupled to the input 226 of the switch 223. The switch 223, like the switch 223 in FIG. 14, is similarly responsive to the control signals fed to the control signal input 229.

Preferably, the converter means of FIGS. 11 and 13 include a DC voltage adding circuit so as to add a DC voltage $V_{DC}$ to the second luminance signal, as explained with reference to FIGS. 5, 7 and 19. Also the converter means of FIGS. 12, 14 and 15 preferably include a DC voltage subtracting circuit so as to bring the second luminance signal back to its original level.

Some of the converter means of FIGS. 11 to 15 can also be used if the recording of an ED video signal, such as the PAL-PLUS video signal, on a digital video recorder is contemplated.

An embodiment of a digital video recorder is shown in FIG. 16. Recording and subsequent reproduction of an SD video signal, such as a PAL signal, is as follows.

A PAL video signal, having the frequency characteristic according to FIGS 2a1 and 2a2, is applied to an input terminal 300 of the video recorder and is fed to a signal separator 301 in which the video signal is split into its (first) luminance signal $Y_1$ and its chrominance signal C. The chrominance signal C is applied to a further signal separator 302, in which the chrominance signal C is mixed, so that it is down converted in frequency to a baseband signal. The down converted chrominance signal also is split into its U- and V-signal components. FIG. 16 schematically shows the frequency characteristic of the U- and V-components. After A/D conversion in an A/D converter 303, the luminance signal $Y_1$ and the U- and V-chrominance signal components are applied to a DCT circuit 304, in which a discrete cosine transform is carried out separately on each of the three signals.

A data reduction is carried out separately on each of the three DCT transformed signals in a data reduction stage 305. After carrying out a channel coding step separately on each of the three signals in a channel coding stage 306, the three signals are recorded on the magnetic record carrier by writing means 307.

Reproduction of the signals is carried out in a manner inverse to the signal treatment during recording. After readout of the signal in reading means 308, the digital signal read out is detected in detector 309 and the digital signal components $Y_1$, U and V are applied to a decoder 310 in which the original digital $Y_1$, U and V signal components are regenerated. After D/A conversion in the D/A converter 311, the three signal components are combined in signal combination units 312 and 313 so as to obtain the original PAL signal at the output 314.

It should be noted that the two splitter stages 301 and 302 could have been combined so as to obtain the $Y_1$, U- and V-components in one signal splitting step, and that the two combination units 312 and 313 could have been combined so as to obtain the PAL signal in one combining step from the $Y_1$, U and V components.

In order to make the digital video signal described above suitable for recording an ED video signal, such as a PAL-PLUS video signal, the following steps should be taken.

One possibility is to leave the digital video recorder unmodified and add converter means, such as the converter means as per FIG. 17, such that the output 210 of the converter means of FIG. 17 is connected to the input 300 of the digital video recorder, and to connect the converter means of FIG. 18 with its input 220 to the output 314 of the digital video recorder. The PAL-PLUS video signal should be applied to the input 200 of the converter means of FIG. 17, and a regenerated PAL-PLUS video signal will be available at the output 228 of the converter means of FIG. 18. The converter means of the FIGS. 17 and 18 show a strong resemblance to the converter means of FIGS. 11 and 12, respectively, with the exception that a signal adding circuit 320 for adding a DC voltage $V_{DC}$ to the second luminance signal, is inserted between the output of the mixer stage 207 and the input 203 of the switching means 202 in the converter means of FIG. 17, and a signal subtracting circuit 322 for subtracting a DV voltage $V_{DC}$ from the second luminance signal, is inserted between the input 220 and the input of the mixer stage 224 of the converter means of FIG. 18.

Applying the PAL-PLUS video signal directly to the input 300 of the digital video recorder of FIG. 16 means that a DCT transformation is carried out in the DCT circuit 304 on the second luminance signal. If the second luminance signal is not down converted in frequency, this signal includes a large high frequency content. A DCT transformation carried out on such a signal results in only a small data reduction to be obtained. For that reason, the second luminance signal should be mixed so as to convert the frequency of the second luminance signal to baseband. This is realized by means of the mixer stage 207 in the converter of FIG. 17, in which the second luminance signal is mixed with a mixing frequency of 4.43 MHz. DCT transformation carried out on the down converted second luminance signal results in a much larger amount of data reduction.

A second problem that can occur when applying the PAL-PLUS video signal directly to the digital video recorder of FIG. 16 is that the operating range of the A/D converter 303 for A/D converting the luminance signal (the first luminance signal as well as the second luminance signal) is not suitable for A/D converting the second luminance signal.

This is well understood when comparing the time signals in FIGS. 2a1, 2a2, 2b1 and 2b2. The operating range of the A/D converter is such that the first luminance signal as it is included in the time signal of FIGS. 2a1 and 2a2 is well A/D converted. In order to bring the second luminance signal into the operating range of the A/D converter, a DC voltage $V_{DC}$ is added to the second luminance signal so as to obtain a signal as shown in FIG. 19.

$V_{DC}$ equals such a value that the active part of the signal lies well within the linear range of the A/D converter. $V_{DC}$ can equal the value of 350 mV given before (the half grey level).

During reproduction, the same DC voltage $V_{DC}$ is subtracted in signal subtracting circuit 322 from the signal included in the second lines so as to obtain the original down converted second luminance signal, see FIG. 18. After mixing the down converted second luminance signal in the mixer stage 224 with a frequency of 4.43 MHz, the original second luminance signal is obtained.

Preferably, amplifiers 321 and 323 are inserted in the converter means of FIGS. 17 and 18, respectively. The amplifier 321 can be a compressor and is adapted to compress the signal applied to its input prior to A/D conversion. This realizes an optimal representation of the second luminance signal in the digital domain as regards signal-to-noise ratio. The amplifier 323 is an expander, which realizes a signal processing of the second luminance signal after D/A conversion which is inverse to the signal processing carried out by the amplifier 321.

In a digital recording and reproduction system, a level shift for the half grey level, as has been explained for the analog recording and reproduction system, does not occur, so that there is no need to transfer information concerning the exact value of the half grey level together with the video information to the reproducing side.

Figure 20:
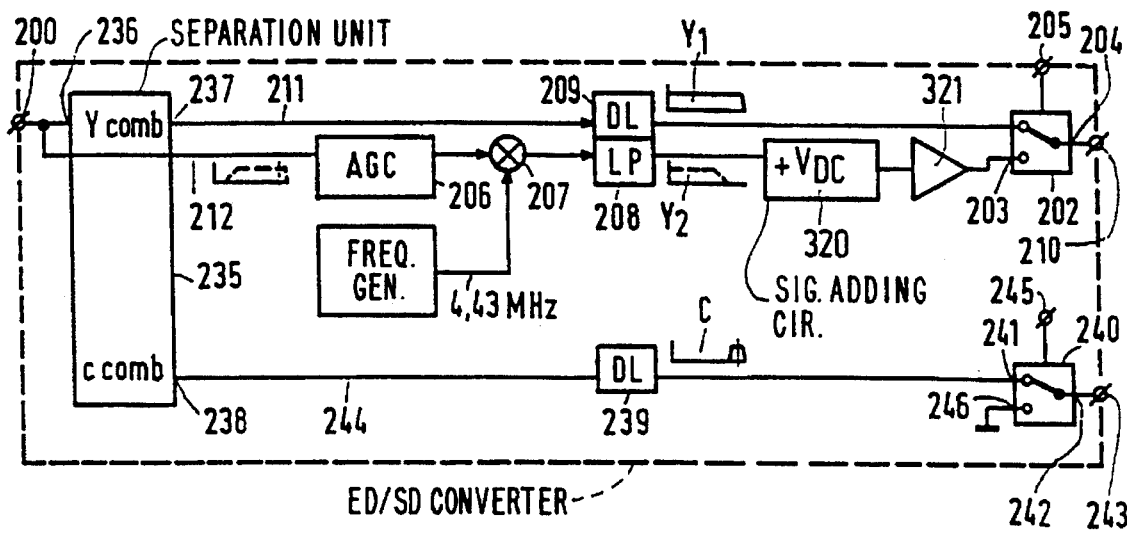
Figure 21:
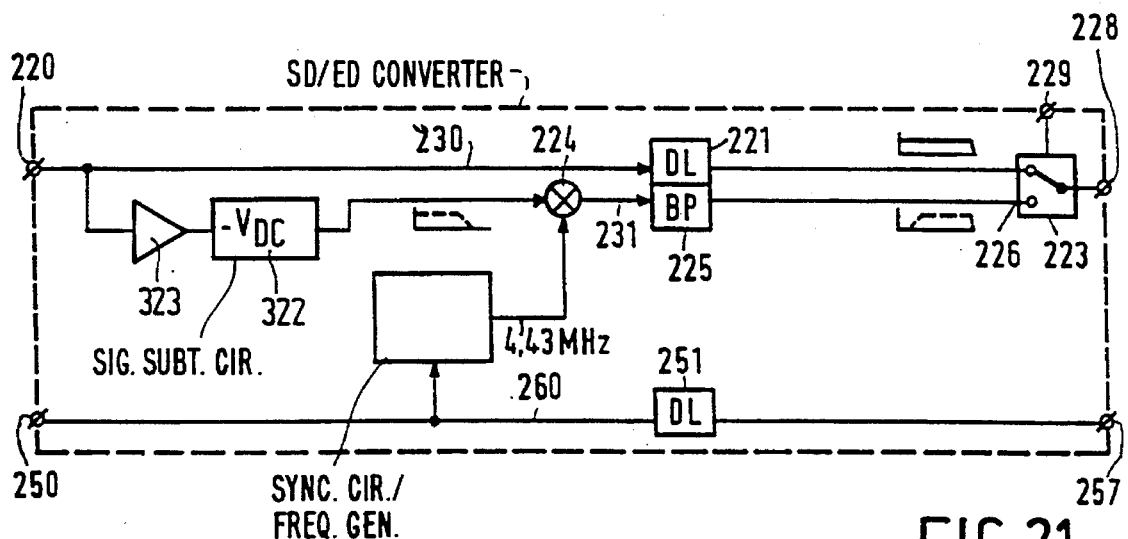

FIG. 20 shows a converter means that can be used as an input circuit in the digital video recorder of FIG. 16. More specifically, the converter means of FIG. 20 can replace the splitter circuit 301 in FIG. 16. In an equivalent way, the converter means of FIG. 21 can be incorporated in the signal combining circuit 313 in FIG. 16. The signal processing carried out on the second luminance signal in the converter means of FIGS. 20 and 21 is identical to the signal processing as carried out on the second luminance signal in the converter means of FIGS. 17 and 18, respectively. Further, the functioning of the converter means of FIGS. 20 and 21 as to the signal processing carried out on the first luminance signal and the chrominance signal is identical to that of the converter means of FIGS. 13 and 15, respectively.

It should be noted that, where in the previous embodiments switching means occur for switching between two input signals so as to bring one of the input signals to their outputs, other kinds of signal combination units than switches also can be used as a means to bring the two input signals to their outputs in their correct form and at the correct moment.

Further, it should be noted that the converter means shown in the FIGS. 11 to 15, 17, 18, 20 and 21 can be in the form of separate units or can be incorporated partly or wholly into a video recorder. If the converter means are in the form of separate units, it is possible to use the converter means in other kinds of transmission systems than video recorders, so as to convert the ED video signal before transmission and to reconvert the video signal received after transmission so as to regenerate the ED video signal.

The signal adding circuits 320 in the converter means of FIGS. 17 and 20 are inserted in the signal path of the second luminance signal, preferably after the mixer stage 207. It is however also possible to insert the signal adding circuits 320 before the inputs of the mixer stage 207. The signal subtracting circuits 322 in the converter means of FIGS. 18 and 21 are inserted in the signal path of the second luminance signal, preferably before the mixer stage 224. It is however possible to insert the subtracting circuits 322 behind the mixer stage 224 or before the other input of the mixer stage 224.

With respect to the control signals necessary for controlling the switches in the various exemplary embodiments, it may be stated that these control signals may be derived in a simple manner in a control signal generator from the vertical and horizontal sync signals in the video counters may be provided for discriminating between the first and second video lines in a video image. On the basis of the above description, it is simply possible to derive switching signals so that the switches operate in the fashion described with reference to the various embodiments of the invention.

What is claimed is:

1. A Converter for converting an extended definition (ED) video signal into a video signal recordable on a video recorder, comprising: an input terminal for receiving the ED video signal which is in the form of pictures, each picture comprising first lines having a chrominance signal and a first luminance signal and second lines comprising a second luminance signal modulated with a suppressed carrier, a separation unit having an input coupled to the input terminal, and having first, second and third outputs, the separation unit including means for deriving from the ED video signal and presenting at the first output the first luminance signal present in the first lines of the ED video signal, for deriving and presenting at the second output the chrominance signal present in the first lines of the ED video signal, and for deriving and presenting at the third output the second luminance signal present in the second lines of the video signal, a mixer stage coupled between the third output of the separation unit and a first input of a signal combination unit, the signal combination unit having a second input coupled to the first output of the separation unit and having an output coupled to a first output terminal of the converter, whereby the signal combination unit supplies the first luminance signal present in the first lines of the ED video signal and the second luminance signal present in the second lines in the ED video signal, and mixed in the mixer, to its output.

2. The converter means as claimed in claim 1, wherein for presenting the second luminance signal at the third output, the separation unit makes a connection between its input and the third output at least during the presence of the second luminance signal in the second lines in the ED video signal.

3. The Converter as claimed in claim 1, further comprising a signal adding circuit connected so as to add a DC voltage to the second luminance signal present in the second lines of the ED video signal.

4. The converter as claimed in claim 1, wherein the signal combination unit comprises first controllable switching means, for connecting, in response to a control signal, the first input to the output at least during the presence of the second luminance signal in the second lines in the ED video signal, and for connecting the second input to the output during the first lines in the ED video signal.

5. The Converter as claimed in claim 4, further comprising a second controllable switching means having an input coupled to the second output of the separation unit and an output coupled to a second output terminal of the converter, and wherein the second controllable switching means decouple its input and output in response to the control signal during the presence of the second luminance signal in the second lines in the ED video signal.

6. The converter as claimed in claim 1, wherein the second lines of the ED video signal do not include a chrominance signal, said converter further comprising; a second signal combination unit having an input coupled to the second output of the separation unit and an output coupled to a second output terminal of the converter for presenting the chrominance signal to the second output terminal, and a low pass filter coupled in cascade with the mixer stage and the first input of the first signal combination unit.

7. A Converter for converting an extended definition (ED) video signal into a video signal recordable on a video recorder, comprising: an input terminal for receiving the ED video signal which is in the form of pictures, each picture comprising first lines having a chrominance signal and a first luminance signal and second lines comprising a second luminance signal modulated with a suppressed carrier, a mixer stage and a signal combination unit with the input terminal coupled to a first input of the signal combination unit, via the mixer stage and, in addition, coupled to a second input of the signal combination unit via a path circumventing the mixer stage, wherein an output of the signal combination circuit is coupled to an output terminal, and the signal combination unit is arranged to supply the first luminance signal present in the first lines of the video signal and the second luminance signal present in the second lines in the ED video signal, and mixed in the mixer, to its output.

8. The converter as claimed in claim 7, wherein the signal combination unit comprises a controllable switching means for connecting, in response to a control signal, the first input to the output at least during the presence of the second luminance signal in the second lines in the ED video signal, and for connecting the second input to the output during the first lines in the ED video signal.

9. The converter as claimed in claim 7, wherein the ED video signal comprises a first field including a first plurality of said second lines, followed by a plurality of said first lines, which in turn are followed by a second plurality of said second lines.

10. The converter as claimed in claim 7, further comprising a signal adding circuit connected so as to add a DC voltage to the second luminance signal present in the second lines of the ED video signal.

11. A Converter for converting a video signal reproduced by a video recorder to an ED video signal in the form of pictures, each picture comprising first lines having a chrominance signal and a first luminance signal and second lines comprising a second luminance signal modulated with a suppressed carrier, comprising: an input terminal for receiving a signal reproduced by the video recorder, and an output terminal for presenting at least the first and second luminance signals for the ED video signal, a mixer stage and a signal combination unit, wherein the input terminal is coupled to a first input and via the mixer stage to a second input of the signal combination unit, an output of the signal combination unit being coupled to the output terminal, in that the signal combination unit is arranged to supply the signal present at its first input to the output so as to obtain the first luminance signal for the first lines of the ED video signal, and for supplying the signal present at its second input to the output so as to obtain the second luminance signal for the second lines of the ED video signal.

12. The Converter as claimed in claim 11, further comprising a signal subtracting circuit connected so as to subtract a DC voltage from the second luminance signal for the second lines of the ED video signal.

13. The Converter as claimed in claim 11, wherein signal combination unit comprises controllable switching means, for connecting, in response to a control signal, the second input to the output at least during the presence of the second luminance signal in the second lines of the ED video signal, and for connecting the first input to the output during the first lines in the ED video signal.

14. The converter as claimed in claim 11 further comprising a second input terminal which receives the chrominance signal present in the video signal reproduced by the video recorder and a second output terminal coupled to said second input terminal.

15. The converter as claimed in claim 11, further comprising a band pass filter coupled in cascade with the mixer stage.

16. The converter as claimed in claim 15, further comprising delay means coupled between said input terminal and said first input of the signal combination unit.

17. A Converter for converting a video signal reproduced by a video recorder to an ED video signal in the form of pictures, each picture comprising first lines having a chrominance signal and a first luminance signal and second lines comprising a second luminance signal modulated with a suppressed carrier, comprising: a first and a second input terminal, a first output terminal for presenting the first luminance signal and a second output terminal for presenting the second luminance signal and the chrominance signal, a mixer stage and a signal combination unit, wherein the first input terminal is coupled to the first output terminal and to an input of the mixer stage, an output of the mixer stage being coupled to a first input of the signal combination unit, the second input terminal being coupled to a second input of the signal combination unit, an output of which is coupled to the second output terminal.

18. The Converter as claimed in claim 17, wherein the signal combination unit comprises controllable switching means, and the controllable switching means connect the first input and the output in response to a control signal during the presence of the second luminance signal component for the second lines in the ED video signal, and connect the second input to the output during the signal forming the first lines and a burst for the second lines in the ED video signal.

19. The converter as claimed in claim 18, further comprising second controllable switching means having an input coupled to the first input terminal and an output coupled to the first output terminal, and wherein the second controllable switching means disconnect its input from its output at least during the presence of the second luminance signal for the second lines in the ED video signal.

20. The converter as claimed in claim 17, further comprising a second signal combination unit having an input coupled to the first input terminal and an output coupled to the first output terminal, and wherein the second signal combination unit is responsive to a control signal whereby the second signal combination unit disconnects its input from its output at least during the presence of the second luminance signal for the ED video signal.

* * * * *